(12) United States Patent
Tudman

(10) Patent No.: US 11,692,000 B2
(45) Date of Patent: Jul. 4, 2023

(54) METHODS OF MAKING SPECIALIZED LIGNIN AND LIGNIN PRODUCTS FROM BIOMASS

(71) Applicant: Apalta Patents OÜ, Möisa (EE)

(72) Inventor: Scott Tudman, Honeoye Falls, NY (US)

(73) Assignee: Apalta Patents OÜ, Tallinn (EE)

( * ) Notice: Subject to any disclaimer, the term of this patent is extended or adjusted under 35 U.S.C. 154(b) by 0 days.

(21) Appl. No.: 17/129,390

(22) Filed: Dec. 21, 2020

(65) Prior Publication Data

US 2021/0284675 A1   Sep. 16, 2021

Related U.S. Application Data

(60) Provisional application No. 62/952,383, filed on Dec. 22, 2019.

(51) Int. Cl.
| | |
|---|---|
| C07G 1/00 | (2011.01) |
| D21C 1/02 | (2006.01) |
| D21C 3/02 | (2006.01) |
| D21C 11/00 | (2006.01) |

(52) U.S. Cl.
CPC ............ *C07G 1/00* (2013.01); *D21C 1/02* (2013.01); *D21C 3/02* (2013.01); *D21C 11/0007* (2013.01)

(58) Field of Classification Search
CPC .......... D21C 1/0007; D21C 1/02; D21C 3/02
See application file for complete search history.

(56) References Cited

U.S. PATENT DOCUMENTS

| | | | |
|---|---|---|---|
| 1,447,461 A | 3/1923 | Brewster et al. |
| 1,867,750 A | 7/1932 | Naugle |
| 2,362,357 A | 11/1944 | Cummins |
| 2,388,222 A | 10/1945 | Behrman |
| 2,594,544 A | 4/1952 | Elving et al. |
| 2,763,580 A | 9/1956 | Zabor |
| 3,563,799 A | 2/1971 | James et al. |
| 3,577,358 A | 5/1971 | Thomas et al. |
| 3,730,770 A | 5/1973 | Zievers et al. |
| 4,048,341 A | 9/1977 | Lagerstrom et al. |
| 4,052,988 A | 10/1977 | Doddi et al. |
| 4,070,232 A | 1/1978 | Funk |
| 4,136,207 A | 1/1979 | Bender |
| 4,136,968 A | 1/1979 | Todd |
| 4,182,780 A | 1/1980 | Lagerstrom et al. |
| 4,186,658 A | 2/1980 | Brown |
| 4,201,596 A | 5/1980 | Burroughs et al. |
| 4,214,947 A | 7/1980 | Berger |
| 4,237,226 A | 12/1980 | Grethlein |
| 4,242,226 A | 12/1980 | Siren et al. |
| 4,288,551 A | 9/1981 | Gudnason et al. |
| 4,326,032 A | 4/1982 | Grove |
| 4,350,766 A | 9/1982 | Mehlberg |
| 4,395,488 A | 7/1983 | Rowe |
| 4,414,330 A | 11/1983 | Zucker et al. |
| 4,427,584 A | 1/1984 | Legrand et al. |
| 4,447,534 A | 5/1984 | Moebus et al. |
| 4,452,973 A | 6/1984 | Casey et al. |
| 4,478,644 A | 10/1984 | Berger et al. |
| 4,478,854 A | 10/1984 | Adler-Nissen et al. |
| 4,502,890 A | 3/1985 | Urbanic |
| 4,520,105 A | 5/1985 | Sinner et al. |
| 4,600,590 A | 7/1986 | Dale |
| 4,612,286 A | 9/1986 | Sherman et al. |
| 4,615,742 A | 10/1986 | Wright |
| 4,632,795 A | 12/1986 | Huber et al. |
| 4,643,191 A | 2/1987 | Bezwada et al. |
| 4,644,060 A | 2/1987 | Chou |
| 4,650,689 A | 3/1987 | Hedrick |
| 4,707,278 A | 11/1987 | Breyer et al. |
| 4,716,203 A | 12/1987 | Casey et al. |
| 4,728,367 A | 3/1988 | Huber et al. |
| 4,806,475 A | 2/1989 | Gould |
| 4,862,168 A | 8/1989 | Beard et al. |
| 4,935,183 A | 6/1990 | Wenger et al. |
| 4,942,035 A | 7/1990 | Churchill et al. |
| 5,019,094 A | 5/1991 | Bezwada et al. |
| 5,037,663 A | 8/1991 | Dale |
| 5,080,665 A | 1/1992 | Jarrett et al. |
| 5,114,488 A | 5/1992 | Huber et al. |
| 5,144,008 A | 9/1992 | Ikeda et al. |
| 5,171,592 A | 12/1992 | Holtzapple et al. |

(Continued)

FOREIGN PATENT DOCUMENTS

| | | |
|---|---|---|
| CA | 1267407 B | 4/1990 |
| CN | 101696261 A | 4/2010 |

(Continued)

OTHER PUBLICATIONS

Cateto et al. (Journal of Applied Polymer Science vol. 109, 3008-3017, 2008) (Year: 2008).*
Li et al. (Biofuel Bioprod. Biorefin. 2018, 1-32) (Year: 2018).*
Wang et al. (Separation and Purification Technology 105, 2013, 98-105) (Year: 2013).*
Ramos (Quim. Nova. 26(6), 863-871, 2003) (Year: 2003).*
Lourencon (Separation and Purification Technology, 154, 2015, 82-88) (Year: 2015).*
Guragain et al. (Bioenerg. Res. (2016) 9:643-655) (Year: 2016).*
Mancera et al. (Polymer Degradation and Stability, 95, 2010, 470-476) (Year: 2010).*
Lloyd TA, Wyman CE., Combined sugar yields for dilute sulfuric acid pretreatment of corn stover followed by enzymatic hydrolysis of the remaining solids, Bioresour Technol. Dec. 2005;96(18):1967-77.doi: 10.1016/j.biortech.2005.01.011. PMID: 16112484.

(Continued)

*Primary Examiner* — Liam J Heincer
(74) *Attorney, Agent, or Firm* — Wilson Sonsini Goodrich & Rosati

(57) ABSTRACT

Provided are cost-effective methods and systems for producing a low molecular weight reactive lignin from a lignocellulosic biomass. The process is rapid and the reactive lignin is easily separated from carbohydrates and other components of the biomass at low cost. This clean lignin product has a very low molecular weight, good hydroxyl content, and low ash and sulfur, making it valuable to many applications.

20 Claims, 11 Drawing Sheets

(56) References Cited

U.S. PATENT DOCUMENTS

| | | |
|---|---|---|
| 5,177,008 A | 1/1993 | Kampen |
| 5,177,009 A | 1/1993 | Kampen |
| 5,232,649 A | 8/1993 | Andersen et al. |
| 5,277,879 A | 1/1994 | Elvin et al. |
| 5,338,366 A | 8/1994 | Grace et al. |
| 5,340,403 A | 8/1994 | Fields et al. |
| 5,378,491 A | 1/1995 | Stanley et al. |
| 5,384,333 A | 1/1995 | Davis et al. |
| 5,449,513 A | 9/1995 | Yokoyama et al. |
| 5,454,911 A | 10/1995 | Rafferty |
| 5,473,061 A | 12/1995 | Bredereck et al. |
| 5,476,909 A | 12/1995 | Kim et al. |
| 5,510,103 A | 4/1996 | Yokoyama et al. |
| 5,543,158 A | 8/1996 | Gref et al. |
| 5,548,035 A | 8/1996 | Kim et al. |
| 5,612,052 A | 3/1997 | Shalaby et al. |
| 5,683,723 A | 11/1997 | Spenlehauer et al. |
| 5,693,296 A | 12/1997 | Holtzapple et al. |
| 5,702,717 A | 12/1997 | Cha et al. |
| 5,726,046 A | 3/1998 | Farone et al. |
| 5,846,787 A | 12/1998 | Ladisch et al. |
| 5,865,898 A | 2/1999 | Holtzapple et al. |
| 5,916,780 A | 6/1999 | Foody et al. |
| 5,939,544 A | 8/1999 | Karstens et al. |
| 5,969,189 A | 10/1999 | Holtzapple et al. |
| 5,986,133 A | 11/1999 | Holtzapple et al. |
| 6,025,452 A | 2/2000 | Kurple |
| 6,043,392 A | 3/2000 | Holtzapple et al. |
| 6,106,888 A | 8/2000 | Dale et al. |
| 6,176,176 B1 | 1/2001 | Dale et al. |
| 6,220,296 B1 | 4/2001 | Ragsdale et al. |
| 6,228,213 B1 | 5/2001 | Hanna et al. |
| 6,247,839 B1 | 6/2001 | Kochanowicz et al. |
| 6,258,175 B1 | 7/2001 | Lightner |
| 6,262,313 B1 | 7/2001 | Holtzapple et al. |
| 6,279,843 B1 | 8/2001 | Coldren et al. |
| 6,316,053 B1 | 11/2001 | Ragsdale et al. |
| 6,332,542 B2 | 12/2001 | Bilodeau et al. |
| 6,355,456 B1 | 3/2002 | Hallberg et al. |
| 6,365,732 B1 | 4/2002 | Van |
| 6,409,841 B1 | 6/2002 | Lombard |
| 6,416,621 B1 | 7/2002 | Karstens |
| 6,475,552 B1 | 11/2002 | Shah et al. |
| 6,478,965 B1 | 11/2002 | Holtzapple et al. |
| 6,509,180 B1 | 1/2003 | Verser et al. |
| 6,541,531 B2 | 4/2003 | Ragsdale |
| 6,599,519 B1 | 7/2003 | Seo et al. |
| 6,616,941 B1 | 9/2003 | Seo et al. |
| 6,872,316 B2 | 3/2005 | Heikkila et al. |
| 6,916,788 B2 | 7/2005 | Seo et al. |
| 6,990,459 B2 | 1/2006 | Schneider |
| 7,109,005 B2 | 9/2006 | Eroma et al. |
| 7,198,925 B2 | 4/2007 | Foody |
| 7,217,770 B2 | 5/2007 | Seo et al. |
| 7,218,975 B2 | 5/2007 | Stevens et al. |
| 7,311,901 B2 | 12/2007 | Seo et al. |
| 7,503,981 B2 | 3/2009 | Wyman et al. |
| 7,521,076 B1 | 4/2009 | Wenger et al. |
| 7,550,157 B2 | 6/2009 | Seo et al. |
| 7,666,637 B2 | 2/2010 | Nguyen |
| 7,807,419 B2 | 10/2010 | Hennessey et al. |
| 7,819,976 B2 | 10/2010 | Friend et al. |
| 7,909,895 B2 | 3/2011 | Dickinson et al. |
| 7,910,338 B2 | 3/2011 | Hennessey et al. |
| 7,930,085 B2 | 4/2011 | Anderson et al. |
| 7,932,063 B2 | 4/2011 | Dunson, Jr. et al. |
| 7,932,065 B2 | 4/2011 | Medoff |
| 7,935,840 B2 | 5/2011 | Leveson et al. |
| 7,988,884 B2 | 8/2011 | Gatto et al. |
| 8,003,352 B2 | 8/2011 | Foody et al. |
| 8,024,074 B2 | 9/2011 | Stelford et al. |
| 8,053,566 B2 | 11/2011 | Belanger et al. |
| 8,086,354 B2 | 12/2011 | Bondar et al. |
| 8,103,385 B2 | 1/2012 | Macharia et al. |
| 8,110,383 B2 | 2/2012 | Joensson et al. |
| 8,123,864 B2 | 2/2012 | Christensen et al. |
| 8,168,840 B2 | 5/2012 | Brady et al. |
| 8,318,453 B2 | 11/2012 | Medoff |
| 8,323,923 B1 | 12/2012 | Horton |
| 8,328,947 B2 | 12/2012 | Anand et al. |
| 8,394,277 B2 | 3/2013 | Bonanni et al. |
| 8,404,051 B2 | 3/2013 | Iyer et al. |
| 8,426,161 B1 | 4/2013 | Horton |
| 8,445,236 B2 | 5/2013 | Hennessey et al. |
| 8,529,765 B2 | 9/2013 | Horton |
| 8,561,533 B2 | 10/2013 | Burke |
| 8,563,277 B1 | 10/2013 | Parekh et al. |
| 8,691,050 B2 | 4/2014 | Christensen |
| 8,722,924 B1 | 5/2014 | Overheul et al. |
| 8,747,561 B2 | 6/2014 | Tao |
| 8,765,430 B2 | 7/2014 | Parekh et al. |
| 8,835,141 B2 | 9/2014 | Zhu et al. |
| 8,858,065 B1 | 10/2014 | Vandalsem et al. |
| 8,926,794 B2 | 1/2015 | Han et al. |
| 8,926,932 B2 | 1/2015 | Pfeifer et al. |
| 8,967,849 B2 | 3/2015 | Vandalsem et al. |
| 9,004,742 B2 | 4/2015 | Burke et al. |
| 9,056,294 B2 | 6/2015 | Fink et al. |
| 9,115,214 B2 | 8/2015 | Nguyen et al. |
| 9,150,936 B2 | 10/2015 | Dottori et al. |
| 9,410,216 B2 | 8/2016 | Eyal et al. |
| 9,476,106 B2 | 10/2016 | Eyal et al. |
| 9,481,760 B2 | 11/2016 | Mukerjee et al. |
| 9,492,945 B2 | 11/2016 | Niven et al. |
| 9,499,635 B2 | 11/2016 | Chesonis et al. |
| 9,499,637 B2 | 11/2016 | Retsina et al. |
| 9,724,213 B2 | 8/2017 | Zhang et al. |
| 9,809,867 B2 | 11/2017 | Parekh et al. |
| 9,931,603 B2 | 4/2018 | Wenger |
| 9,944,559 B2 | 4/2018 | Scharlemann et al. |
| 9,982,004 B2 | 5/2018 | Valkonen et al. |
| 10,036,049 B2 | 7/2018 | Shaghasi et al. |
| 10,053,482 B2 | 8/2018 | Thies et al. |
| 10,053,745 B2 | 8/2018 | Kilambi et al. |
| 10,100,073 B2 | 10/2018 | Jung et al. |
| 10,344,757 B1 | 7/2019 | Stark et al. |
| 10,526,456 B2 | 1/2020 | Miettinen |
| 10,844,413 B2 | 11/2020 | Lumpkin |
| 2002/0003058 A1 | 1/2002 | Hori et al. |
| 2002/0038058 A1 | 3/2002 | Holtzapple et al. |
| 2002/0153317 A1 | 10/2002 | Heikkila et al. |
| 2002/0164730 A1 | 11/2002 | Ballesteros et al. |
| 2002/0164731 A1 | 11/2002 | Eroma et al. |
| 2002/0192774 A1 | 12/2002 | Ahring et al. |
| 2002/0197686 A1 | 12/2002 | Lightner |
| 2003/0109011 A1 | 6/2003 | Hood et al. |
| 2003/0143659 A1 | 7/2003 | Bijl et al. |
| 2003/0199049 A1 | 10/2003 | Nguyen et al. |
| 2003/0221361 A1 | 12/2003 | Russell et al. |
| 2003/0224088 A1 | 12/2003 | Burdick |
| 2004/0152881 A1 | 8/2004 | Holtzapple et al. |
| 2004/0168960 A1 | 9/2004 | Holtzapple et al. |
| 2004/0168966 A1 | 9/2004 | Marheine |
| 2004/0171136 A1 | 9/2004 | Holtzapple et al. |
| 2004/0244925 A1 | 12/2004 | Tarasenko |
| 2005/0054064 A1 | 3/2005 | Talluri et al. |
| 2005/0136520 A1 | 6/2005 | Kinley et al. |
| 2005/0203291 A1 | 9/2005 | Svenson et al. |
| 2005/0244934 A1 | 11/2005 | Foody et al. |
| 2005/0271770 A1 | 12/2005 | Hughes |
| 2005/0272134 A1 | 12/2005 | Hughes |
| 2006/0003064 A1 | 1/2006 | James |
| 2006/0020126 A1 | 1/2006 | Kopesky et al. |
| 2006/0024801 A1 | 2/2006 | Holtzapple et al. |
| 2006/0032113 A1 | 2/2006 | Whitney |
| 2006/0069244 A1 | 3/2006 | Holtzapple et al. |
| 2006/0090749 A1 | 5/2006 | Rein et al. |
| 2006/0113406 A1 | 6/2006 | Ganser |
| 2006/0188980 A1 | 8/2006 | Holtzapple et al. |
| 2006/0211101 A1 | 9/2006 | Chotani et al. |
| 2006/0251764 A1 | 11/2006 | Abbas et al. |
| 2006/0281157 A1 | 12/2006 | Chotani et al. |

(56) References Cited

U.S. PATENT DOCUMENTS

| | | |
|---|---|---|
| 2007/0016095 A1 | 1/2007 | Low et al. |
| 2007/0037259 A1 | 2/2007 | Hennessey et al. |
| 2007/0118916 A1 | 5/2007 | Puzio et al. |
| 2007/0148750 A1 | 6/2007 | Hoshino et al. |
| 2007/0148751 A1 | 6/2007 | Griffin et al. |
| 2007/0164143 A1 | 7/2007 | Sabourin et al. |
| 2007/0190626 A1 | 8/2007 | Wilkening et al. |
| 2007/0237022 A1 | 10/2007 | Wiltz et al. |
| 2007/0275447 A1 | 11/2007 | Lewis et al. |
| 2008/0014617 A1 | 1/2008 | Cerea |
| 2008/0057555 A1 | 3/2008 | Nguyen |
| 2008/0121359 A1 | 5/2008 | Holtzapple et al. |
| 2008/0145903 A1 | 6/2008 | Holmes et al. |
| 2008/0176301 A1 | 7/2008 | Granda et al. |
| 2008/0227162 A1 | 9/2008 | Varanasi et al. |
| 2008/0280338 A1 | 11/2008 | Hall et al. |
| 2008/0286193 A1 | 11/2008 | Bento et al. |
| 2009/0004698 A1 | 1/2009 | Vande et al. |
| 2009/0023187 A1 | 1/2009 | Foody et al. |
| 2009/0042259 A1 | 2/2009 | Dale et al. |
| 2009/0043686 A1 | 2/2009 | Matsumoto |
| 2009/0053800 A1 | 2/2009 | Friend et al. |
| 2009/0064566 A1 | 3/2009 | Brummerstedt et al. |
| 2009/0084801 A1 | 4/2009 | Coe |
| 2009/0098617 A1 | 4/2009 | Burke et al. |
| 2009/0117635 A1 | 5/2009 | Bradley et al. |
| 2009/0118477 A1* | 5/2009 | Hallberg ............... C12P 7/08 162/14 |
| 2009/0126276 A1 | 5/2009 | Johnson et al. |
| 2009/0181434 A1 | 7/2009 | Aikens et al. |
| 2009/0221814 A1 | 9/2009 | Pschorn et al. |
| 2009/0298149 A1 | 12/2009 | Wang et al. |
| 2010/0008998 A1 | 1/2010 | Kang et al. |
| 2010/0021980 A1 | 1/2010 | McDonald et al. |
| 2010/0041119 A1 | 2/2010 | Christensen et al. |
| 2010/0043246 A1 | 2/2010 | Smith et al. |
| 2010/0055741 A1 | 3/2010 | Galvez, III et al. |
| 2010/0056774 A1 | 3/2010 | Anand et al. |
| 2010/0081798 A1 | 4/2010 | Balensiefer et al. |
| 2010/0082139 A1 | 4/2010 | Macharia et al. |
| 2010/0082140 A1 | 4/2010 | Macharia et al. |
| 2010/0082166 A1 | 4/2010 | Macharia et al. |
| 2010/0103769 A1 | 4/2010 | Bachman et al. |
| 2010/0143974 A1 | 6/2010 | Chung et al. |
| 2010/0144001 A1 | 6/2010 | Horton |
| 2010/0216201 A1 | 8/2010 | Soong et al. |
| 2010/0221805 A1 | 9/2010 | Kelly |
| 2010/0221819 A1 | 9/2010 | Foody et al. |
| 2010/0227369 A1 | 9/2010 | Narendranath et al. |
| 2010/0317053 A1 | 12/2010 | Stromberg et al. |
| 2011/0020874 A1 | 1/2011 | Hata |
| 2011/0033268 A1 | 2/2011 | Craig et al. |
| 2011/0039317 A1 | 2/2011 | Medoff |
| 2011/0054059 A1 | 3/2011 | Li et al. |
| 2011/0079219 A1 | 4/2011 | McDonald et al. |
| 2011/0081689 A1 | 4/2011 | Flanegan et al. |
| 2011/0114765 A1 | 5/2011 | Brady et al. |
| 2011/0129886 A1 | 6/2011 | Howard et al. |
| 2011/0171709 A1 | 7/2011 | Bardsley et al. |
| 2011/0175358 A1 | 7/2011 | Langson |
| 2011/0197496 A1 | 8/2011 | O'Connor et al. |
| 2011/0201084 A1 | 8/2011 | Wyman et al. |
| 2011/0212487 A1 | 9/2011 | Emme et al. |
| 2011/0223641 A1 | 9/2011 | Stephanopoulos et al. |
| 2011/0244499 A1 | 10/2011 | Realff et al. |
| 2011/0258911 A1 | 10/2011 | Hanson et al. |
| 2011/0258913 A1 | 10/2011 | Stamires et al. |
| 2011/0262985 A1 | 10/2011 | Medoff |
| 2011/0275860 A1 | 11/2011 | Beldring et al. |
| 2011/0300586 A1 | 12/2011 | Liu et al. |
| 2012/0006320 A1 | 1/2012 | Nguyen |
| 2012/0037325 A1 | 2/2012 | Beldring et al. |
| 2012/0041186 A1 | 2/2012 | Pschorn et al. |
| 2012/0100045 A1 | 4/2012 | Beldring et al. |
| 2012/0100577 A1 | 4/2012 | Medoff et al. |
| 2012/0107888 A1 | 5/2012 | Schmalisch et al. |
| 2012/0108798 A1 | 5/2012 | Wenger et al. |
| 2012/0116063 A1 | 5/2012 | Jansen et al. |
| 2012/0122162 A1 | 5/2012 | Romero et al. |
| 2012/0125324 A1 | 5/2012 | Fisk |
| 2012/0125738 A1 | 5/2012 | Ikeda et al. |
| 2012/0184721 A1 | 7/2012 | Wingerson et al. |
| 2012/0190092 A1 | 7/2012 | Jaquess et al. |
| 2012/0196233 A1 | 8/2012 | Ni et al. |
| 2012/0211427 A1 | 8/2012 | Bonanni et al. |
| 2012/0214205 A1 | 8/2012 | Iida et al. |
| 2012/0214216 A1 | 8/2012 | Brady et al. |
| 2012/0269715 A1 | 10/2012 | Kamegawa et al. |
| 2012/0282655 A1 | 11/2012 | Gibbs |
| 2012/0302699 A1 | 11/2012 | Kobune et al. |
| 2013/0014749 A1 | 1/2013 | Dottori et al. |
| 2013/0071903 A1 | 3/2013 | Rowland et al. |
| 2013/0118483 A1 | 5/2013 | Gao et al. |
| 2013/0172540 A1 | 7/2013 | Simard et al. |
| 2013/0199518 A1 | 8/2013 | Dahl |
| 2013/0210101 A1 | 8/2013 | Parekh et al. |
| 2013/0225854 A1 | 8/2013 | Ryba et al. |
| 2013/0252293 A1* | 9/2013 | Chen ............... C08H 6/00 530/507 |
| 2013/0274455 A1 | 10/2013 | Parekh et al. |
| 2013/0274456 A1 | 10/2013 | Parekh et al. |
| 2013/0323830 A1 | 12/2013 | Horton |
| 2014/0034047 A1 | 2/2014 | Retsina et al. |
| 2014/0038243 A1 | 2/2014 | Balan et al. |
| 2014/0106418 A1 | 4/2014 | Parekh et al. |
| 2014/0110324 A1 | 4/2014 | Lehoux et al. |
| 2014/0121359 A1* | 5/2014 | Thies ............... C07G 1/00 530/500 |
| 2014/0154756 A1 | 6/2014 | Nelson et al. |
| 2014/0178944 A1 | 6/2014 | Parekh et al. |
| 2014/0188543 A1 | 7/2014 | Pearlmutter et al. |
| 2014/0200334 A1 | 7/2014 | Lake et al. |
| 2014/0242867 A1 | 8/2014 | Jansen et al. |
| 2014/0248676 A1 | 9/2014 | Griffin et al. |
| 2014/0262727 A1 | 9/2014 | Felix et al. |
| 2014/0275500 A1 | 9/2014 | Mikhnevich et al. |
| 2014/0342423 A1 | 11/2014 | Parekh et al. |
| 2015/0018584 A1 | 1/2015 | Parekh et al. |
| 2015/0075738 A1* | 3/2015 | Wimby ............... D21C 11/0007 162/16 |
| 2015/0183948 A1 | 7/2015 | Chuang et al. |
| 2015/0196893 A1 | 7/2015 | Mennell et al. |
| 2015/0197424 A1 | 7/2015 | Mennell et al. |
| 2015/0224428 A1 | 8/2015 | Lehoux et al. |
| 2015/0232902 A1 | 8/2015 | Romero et al. |
| 2015/0322170 A1 | 11/2015 | Haggblom et al. |
| 2015/0329927 A1 | 11/2015 | Parekh |
| 2015/0343405 A1* | 12/2015 | Gastaldo ............... C10G 3/00 422/232 |
| 2015/0368441 A1 | 12/2015 | Retsina et al. |
| 2016/0002467 A1 | 1/2016 | Erdmann et al. |
| 2016/0031713 A1 | 2/2016 | Fish et al. |
| 2016/0032414 A1 | 2/2016 | Parekh et al. |
| 2016/0032525 A1 | 2/2016 | Kurple et al. |
| 2016/0194433 A1 | 7/2016 | Langlois et al. |
| 2016/0222045 A1 | 8/2016 | Argyropoulos |
| 2016/0268107 A1 | 9/2016 | White et al. |
| 2016/0273009 A1 | 9/2016 | Lumpkin et al. |
| 2016/0312259 A1* | 10/2016 | Vainio ............... C12P 7/64 |
| 2016/0333146 A1 | 11/2016 | Miettinen et al. |
| 2017/0016179 A1 | 1/2017 | Olkowski et al. |
| 2017/0226535 A1* | 8/2017 | Tudman ............... C01B 32/342 |
| 2017/0247255 A1 | 8/2017 | Wittmann et al. |
| 2017/0313826 A1 | 11/2017 | Jansen et al. |
| 2018/0002451 A1 | 1/2018 | Ge et al. |
| 2018/0016355 A1 | 1/2018 | Nelson et al. |
| 2018/0030555 A1* | 2/2018 | Van Tuel ............... C08H 6/00 |
| 2018/0079871 A1 | 3/2018 | Tudman |
| 2019/0010660 A1* | 1/2019 | Srivastava ............... D21C 3/02 |
| 2019/0040478 A1 | 2/2019 | Tudman et al. |
| 2019/0390405 A1* | 12/2019 | Geigle ............... D21C 3/022 |
| 2021/0040524 A1 | 2/2021 | Lumpkin |

(56) References Cited

U.S. PATENT DOCUMENTS

| | | | |
|---|---|---|---|
| 2021/0285155 A1 | 9/2021 | Tudman et al. | |
| 2022/0090156 A1 | 3/2022 | Parekh et al. | |

FOREIGN PATENT DOCUMENTS

| | | |
|---|---|---|
| CN | 102216435 A | 10/2011 |
| CN | 102585248 A | 7/2012 |
| EP | 0037912 A2 | 10/1981 |
| EP | 0105937 B1 | 11/1987 |
| EP | 0364632 A1 | 4/1990 |
| EP | 0150933 B2 | 8/1997 |
| EP | 1259466 B1 | 10/2008 |
| EP | 1307735 B1 | 11/2008 |
| EP | 1299170 B1 | 8/2010 |
| EP | 2812437 A1 | 12/2014 |
| EP | 2836602 A1 | 2/2015 |
| JP | 2006149343 A | 6/2006 |
| KR | 20100123093 A | 11/2010 |
| KR | 20110046090 | 5/2011 |
| KR | 20110046090 A | 5/2011 |
| KR | 20130115577 | 10/2013 |
| KR | 20130115577 A | 10/2013 |
| KR | 101391435 B1 | 5/2014 |
| KR | 20140072866 A | 6/2014 |
| WO | WO-9640970 A1 | 12/1996 |
| WO | WO-0132715 A1 | 5/2001 |
| WO | WO-0160752 A1 | 8/2001 |
| WO | WO-0200324 A1 | 1/2002 |
| WO | WO-0201220 A2 | 1/2002 |
| WO | WO-0201220 A3 | 9/2002 |
| WO | WO-2004011501 A1 | 2/2004 |
| WO | WO-2004081193 A2 | 9/2004 |
| WO | WO-2004108969 A1 | 12/2004 |
| WO | WO-2004113551 A1 | 12/2004 |
| WO | WO-2005052195 A1 | 6/2005 |
| WO | WO-2005087937 A2 | 9/2005 |
| WO | WO-2005118828 A1 | 12/2005 |
| WO | WO-2006024242 A1 | 3/2006 |
| WO | WO-2006031175 A1 | 3/2006 |
| WO | WO-2006101832 A2 | 9/2006 |
| WO | WO-2007009463 A2 | 1/2007 |
| WO | WO-2007009463 A3 | 7/2007 |
| WO | WO-2008020901 A2 | 2/2008 |
| WO | WO-2008073186 A2 | 6/2008 |
| WO | WO-2006101832 A3 | 4/2009 |
| WO | WO-2009045651 A2 | 4/2009 |
| WO | WO-2009058276 A1 | 5/2009 |
| WO | WO-2009063138 A2 | 5/2009 |
| WO | WO-2009087680 A2 | 7/2009 |
| WO | WO-2010011328 A1 | 1/2010 |
| WO | WO-2010034055 A1 | 4/2010 |
| WO | WO-2010037780 A1 | 4/2010 |
| WO | WO-2010056940 A2 | 5/2010 |
| WO | WO-2010068637 A1 | 6/2010 |
| WO | WO-2010115488 A1 | 10/2010 |
| WO | WO-2010121348 A1 | 10/2010 |
| WO | WO-2010123932 A1 | 10/2010 |
| WO | WO-2011003962 A2 | 1/2011 |
| WO | WO-2011022811 A1 | 3/2011 |
| WO | WO-2011028554 A1 | 3/2011 |
| WO | WO-2011028853 A1 | 3/2011 |
| WO | WO-2011095335 A1 | 8/2011 |
| WO | WO-2011103033 A1 | 8/2011 |
| WO | WO-2012051523 A1 | 4/2012 |
| WO | WO-2012099967 A1 | 7/2012 |
| WO | WO-2012155239 A1 | 11/2012 |
| WO | WO-2013083876 A2 | 6/2013 |
| WO | WO-2013120035 A1 | 8/2013 |
| WO | WO-2013144445 A1 | 10/2013 |
| WO | WO-2013148415 A1 | 10/2013 |
| WO | WO-2013155496 A1 | 10/2013 |
| WO | WO-2013186184 A1 | 12/2013 |
| WO | WO-2014026154 A1 | 2/2014 |
| WO | WO-2014039984 A1 | 3/2014 |
| WO | WO-2013083876 A3 | 5/2014 |
| WO | WO-2014143753 A1 | 9/2014 |
| WO | WO-2014169079 A2 | 10/2014 |
| WO | WO-2014190294 A1 | 11/2014 |
| WO | WO-2015044528 A1 | 4/2015 |
| WO | WO-2015079107 A1 | 6/2015 |
| WO | WO-2015179243 A1 | 11/2015 |
| WO | WO-2016001484 A1 | 1/2016 |
| WO | WO-2016094594 A1 | 6/2016 |
| WO | WO-2016128224 A1 | 8/2016 |
| WO | WO-2017037349 A1 | 3/2017 |
| WO | WO-2017049090 A1 | 3/2017 |
| WO | WO-2018053530 A1 | 3/2018 |
| WO | WO-2018151833 A1 | 8/2018 |
| WO | WO-2019094444 A1 | 5/2019 |
| WO | WO-2020160565 A1 | 8/2020 |
| WO | WO-2021133733 A1 | 7/2021 |
| WO | WO-2022072870 A1 | 4/2022 |
| WO | WO-2022072872 A1 | 4/2022 |
| WO | WO-2022072873 A1 | 4/2022 |
| WO | WO-2022086983 A1 | 4/2022 |
| WO | WO-2022087431 A1 | 4/2022 |

OTHER PUBLICATIONS

Holladay, JE, et al., "Top Value Added chemicals from Biomass", (2007). vol. II, Pacific Northwest National Laboratory (PNNL) and the National Renewable Energy Laboratory (NREL).

Mosier, et al. Features of promising technologies for pretreatment of lignocellulosic biomass. Bioresour Technol. Apr. 2005;96(6):673-86.

Cateto, C.A., et al. Lignins as macromonomers for polyurethane synthesis: A comparative study on hydroxyl group determination. Journal of Applied Polymer Science. Sep. 5, 2008;109(5):3008-17.

Guragain Y.N., et al. Novel biomass pretreatment using alkaline organic solvents: a green approach for biomass fractionation and 2, 3-butanediol production. BioEnergy Research. Jun. 2016;9(2):643-55.

Li T, Takkellapati S. The current and emerging sources of technical lignins and their applications. Biofuel Bioprod Biorefin. Jul. 18, 2018;0:1-32.

Lourençon T.V., et al. Hardwood and softwood kraft lignins fractionation by simple sequential acid precipitation. Separation and purification technology. Nov. 5, 2015;154:82-8.

Mancera A, et al. Physicochemical characterisation of sugarcane bagasse lignin oxidized by hydrogen peroxide. Polymer Degradation and Stability. Apr. 1, 2010;95(4):470-6.

Ramos LP. The chemistry involved in the steam treatment of lignocellulosic materials. Química Nova. Dec. 2003;26(6):863-71.

Wang G, Chen H. Fractionation of alkali-extracted lignin from steam-exploded stalk by gradient acid precipitation. Separation and Purification Technology. Feb. 5, 2013;105:98-105. Epub Dec. 20, 2012.

International Search Report and Written Opinion dated Mar. 18, 2021 for International Application Serial No. PCT/US2020/066435,(11 pages).

Agbor, et al. Biomass pretreatment: fundamentals toward application. Biotechnol Adv. Nov.-Dec. 2011;29(6):675-85. doi: 10.1016/j.biotechadv.2011.05.005. Epub May 23, 2011.

Alcohol and Tobacco Tax and Trade Bureau, treasury. 27 C.F.R. §19.134 Bonded warehouse not on premises qualified for production of spirits, p. 381, Apr. 1, 1997 revision.

Aldrich. 2003-2004. Particle size conversion Table, 2 Pages or p. T848 of the Aldrich 2003-2004 Catalog/Handbook of Fine Chemicals.

Arshanitsa, et al., Two Approaches for Introduction of Wheat Straw Lignin into Rigid Polyurethane Foams. AIP Conf. Proc. 1593, 388-391 (2014); doi: 10.1063/1.4873806.

Ballesteros, et al. Ethanol from lignocellulose materials by a simultaneous saccharification and fermentation process (SFS) with Kluyveromyces marxianus CECT 10875. Process Biochemistry, vol. 39, pp. 1843-1848, 2004.

Boggan. 2003. Alcohol, Chemistry and You Sources and Uses of Ethyl Alcohol. Kennesaw State University, pp. 1-5, Printed May 17, 2010. http://www.chemcases.com/alcohol/alc-03.htm/.

(56) References Cited

OTHER PUBLICATIONS

Bolsen, et al. Silage Fermentation and Silage Additives: Review. AJAS 1996 vol. 9 (No. 5). pp. 483-493.
Borregaard, Potential applications for different lignin sources based on experience from Borregaard and what about the future? Oct. 21, 2015; 26 Pages.
Brigham, et al. Bacterial Carbon Storage to Value Added Products. J Microbial Biochem Technol 2011, S3-002.
Cambridge University Press, (n.d.). Cut. In Cambridge Dictionary. Retrieved Sep. 2022, from https://dictionary.cambridge.org/us/dictionary/english/cut.
Chen, et al., "Pretreatment efficiency and structural characterization of rice straw by an integrated process of dilute-acid and steam explosion for bioethanol production" (2010) Bioresource Technology, 102, pp. 2916-2924.
ConvertUnits.com. (n.d.). psig to kpa conversion. In ConvertUnits. com. Retrieved Sep. 2022, from https://www.convertunits.com/from/psig/to/kpa.
Co-pending U.S. Appl. No. 13/793,860, inventor Jerry; W. Horton, filed Mar. 11, 2013.
Co-pending U.S. Appl. No. 15/293,478, inventors Chesonis; Arunas et al., filed Oct. 14, 2016.
Co-pending U.S. Appl. No. 15/418,204, inventors Parekh; Sarad et al., filed Jan. 27, 2017.
Dale, et al. Hydrolysis of lignocellulosics at low enzyme levels: Application of the AFEX process. Bioresource Technology. Apr. 1996; 56(1):111-116.
Dasari, et al. The effect of particle size on hydrolysis reaction rates and rheological properties in cellulosic slurries. Appl Biochem Biotechnol. Apr. 2007;136-140(1-12):289-99. doi: 10.1007/s12010-007-9059-x.
David W. Templeton, "Assessing corn stover composition and sources of variability via NIRS", Cellulose (2009) 16:621-639.
Dictionary.com, LLC. (n.d.). Blender. In Dictionary.com. Retrieved Sep. 2022, from https://www.dictionary.com/browse/blender.
Dionex CarboPac PA10. Column Product Manual. Thermo Scientific. P/N: 065495-01. Dec. 2012.
Dowe, et al. 2001. SSF Experimental Protocols—Lignocellulosic Biomass Hydrolysis and Fermentation Laboratory Analytical Procedure (LAP), National Renewable Energy Laboratory. 1617 Cole Boulevard, Golden, Colorado. Issue Date: Oct. 30, 2001, pp. 1-18.
Dowe, et al. (SSF Experimental Protocols—Lignocellulosic Biomass Hydrolysis and Fermentation. Laboratory Analytical Procedure (LAP), Issue Date: Oct. 30, 2001. National Renewable Energy Laboratory, 1617 Cole Boulevard, Golden, Colorado 80401-3393, 76 Pages) 2008.
Fang, H., Deng, J., & Zhang, X. Continuous steam explosion of wheat straw by high pressure mechanical refining system to produce sugars for bioconversion. BioResources 6.4 (2011): 4468-4480.
Felix et al. In vitro and in vivo digestibility of soya-bean straw treated with various alkalis. Anim Prod. 1990; 51:47-61.
Fernandes Diniz, J. M. B., M. H. Gil, and J. A. A. M. Castro., "Hornification—its origin and interpretation in wood pulps." Wood Science and Technology 37.6 (2004): 489-494.
Gibreel, et al. Fermentation of barley by using *Saccharomyces cerevisiae*: examination of barley as a feedstock for bioethanol production and value-added products. Appl Environ Microbiol. Mar. 2009;75(5):1363-72. doi: 10.1128/AEM.01512-08. Epub Dec. 29, 2008.
Gregorova, et al., Lignin-Containing Polyethylene Films With Antibacterial Activity.Brno, Czech Republic, EU, 2011; 21-23, 9.
Gum,et al. Structural characterization of a glycoprotein cellulase, 1,4-beta-D-glucan cellubiohydrolase C from trichodermaviride. Biochem. Biophys. Acta. 1976; 446:370-86.
Hong-Zhang Chen and Zhi-Hua Liu, "Steam explosion and its combinatorial pretreatment refining technology of plant biomass to bio-based products", Biotechnology Journal, 2015, 10, 866-885.
Hong-Zhang Chen and Zhi-Hua Liu, "Stem explosion and its combinatorial pretreatment refining technology of plant biomass to bio-based products", Biotechnology Journal, 2015, 10, pp. 866-885.
Huang, et al., Characterization of Biobased Polyurethane Foams Employing Lignin Fractionated from Microwave Liquefied Switchgrass. Hindawi International Journal of Polymer Science vol. 2017, Article ID 4207367, 8 pages https://doi.org/10.1155/2017/4207367.
Jin, et al., Liquefaction of lignin by polyethyleneglycol and glycerol. Bioresource Technology 102 (2011) 3581-3583.
Jones, et al. (1994, Ethanolic Fermentation of Blackstrap Molasses and Sugarcane Juice Using Very High Gravity Technology. J. Agric. Food Chem, vol. 42, pp. 1242-1246).
Kamal, et al., Detoxification of sago trunk hydrolysate using activated charcoal for xylitol production, Procedia Food Science 1, (2011) 908-913.
Kim, et al. Lime pretreatment and enzymatic hydrolysis of corn stover. Bioresour Technol. Dec. 2005;96(18):1994-2006.
Kim, et al. Pretreatment and fractionation of corn stover by ammonia recycle percolation process. Bioresour Technol. Dec. 2005;96(18):2007-13.
Larsson, et al. Comparison of different methods for the detoxification of lignocellulose hydrolyzates of spruce. Applied Biochemistry and Biotechnology. 1999; 77-79:91-103.
Lignimatch. Future use of lignin in value added products: A roadmap for possible Nordic/Baltic innovation. The roadmap compiles inputs from the detailed technical reports delivered in the LigniMatch project during 2007-2009. For more information, see the project website at http://www.chalmers.se/gmv/EN/projects/lignimatch.
Malherbe, et al. Lignocellulose biodegradation: Fundamentals and applications. Re/Views in Environmental Science & Bio/Technology. 2001; 1:105-114.
Marie Linde et al., "Steam Pretreatment of Acid-Sprayed and Acid-Soaked Barley Straw for Production of Ethanol", Applied Biochemistry and Biotechnology, vol. 129-132, 2006.
Merriam-Webster, (n.d.). Shear. In Merriam-Webster Dictionary. Retrieved Sep. 2022, from https://www.merriam-webster.com/dictionary/shear.
Milford Hanna et al., "Production of Microcrystalline Cellulose by Reactive Extrusion", University of Nebraska-Lincoln, Digital Commons@University of Nebraska-Lincoln, May 8, 2001.
Nevoigt, et al. Osmoregulation and glycerol metabolism in the yeast *Saccharomyces cerevisiae*. FEMS Microbiol Rev. Nov. 1997;21(3):231-41.
Oxford University Press, (n.d.). Concurrent. In Oxford Lexico Dictionary. Retrieved Sep. 2022, from https://www.dictionary.com/browse/concurrent.
Palmqvist, et al. Fermentation of lignocellulosic hydrolysates. I: inhibition and detoxification. Bioresource Technology. 2000; 74(1):17-24.
Parekh, et al. Production of glycerol by hansenula anomala. Biotechnol Bioeng. Jul. 1985;27(7):1089-91.
Quang A. Nguyen et al., "Two-Stage Dilute-Acid Pretreatment of Softwoods", Applied Biochemistry and Biotechnolgy, vol. 84-86, 200, 561-576.
Quantitative Instrument Analysis, https://www.gmu.edu/depts/SRIF/tutorial/gcd/quant.htm, p. s1-3; Updated May 8, 1998, Printed Jun. 23, 2015.
Santoro, et al. A High-throughput Platform for Screening Milligram Quantities of Plant Biomass for Lignocellulose Digestibility. Bioenerg. Res. Jan. 2010; 3:93-102.
Shapouri, et al. 2006. The Economic Feasibility of Ethanol Production From Sugar in the United States, USDA, 78 Pages, Jul. 2006.
Shijie Liu, "Woody biomass: Niche position as a source of sustainable renewable chemicals and energy and kinetics of hot-water extraction/hydrolysis", Biotechnology Advances 28 (2010) 563-582.
Shijie Liu "Woody biomass: Niche position as a source of sustainable renewable chemicals and energy and kinetics of hot-water extraction/hydrolysis", Biotechnology Advances 28 (2010) pp. 563-582.
Silva, et al. Downstream processing for xylitol recovery from fermented sugar cane bagasse hydrolysate using aluminium polychloride. Z Naturforsch C. Jan.-Feb. 2000;55(1-2):10-5.

(56) References Cited

OTHER PUBLICATIONS

Sluiter, et al. Determination of structural carbohydrates and lignin in biomass. National Renewable Energy Laboratory. Technical report NREL/TP-510-42618. Revised Jun. 2010.

Sun, et al. Dilute acid pretreatment of rye straw and bermudagrass for ethanol production. Bioresour Technol. Sep. 2005;96(14):1599-606. Epub Feb. 24, 2005.

Taherzadeh, et al. Pretreatment of Lignocellulosic Wastes to Improve Ethanol and Biogas Production: A Review. International Journal of Molecular Sciences. 2008(9). pp. 1621-1651.

Taylor. From Raw Sugar to Raw materials. Chemical innovation. 2000; 30:45-48.

Tucker, et al., "Effects of Temperature and Moisture" (2003) Applied Biochemistry and Biotechnology, 105-108, pp. 165-177.

USDA, "The Economic Feasibility of Ethanol Production From Sugar in the United States"; Jul. 2006, 69 pages.

Valery B. Agbor et al., "Biomass pretreatment: Fundamentals toward application", Biotechnology Advances 29 (2011) 675-685.

Varhegyi, et al. (1989. Kinetics of the thermal decomposition of cellulose, hemicellulose, and sugarcane bagasse. Energy Fuels, vol. 3, No. 3, pp. 329-335).

Waiss, et al. Improving Digestibility of Straws for Ruminant Feed by Aqueous Ammonia. Journal of Animal Science. 1972; 35(1):109-112.

Wallace.,Feasibility Study of Co-Locating and Integrating Ethanol Production Plants from Corn Starch and Lignocellulosic Feedstocks. United States Department of Agriculture, United States Department of Energy, 2005, NREL, Golden Colorado, Wyndmoor, PA.

Waltermann, et al. *Rhodococcus opacus* strain PD630 as a new source of high-value single-cell oil? Isolation and characterization of triacylglycerols and other storage lipids. Microbiology. 2000; 146:1143-1149.

Wen-Hua Chen et al., "Pretreatment efficiency and structural characterization of rice straw by an integrated process of dilute-acid and steam explosion for bioethanol production", Bioresource Technology 102 (2011) 2916-2924.

Woiciechowski, et al. Acid and Enzymatic Hydrolysis to Recover Reducing Sugars from Cassava Bagasse: an Economic Study. Brazilian Archives of Biology and Technology, vol. 45, No. 3, pp. 393-400, 2002.

Xue, et al., Producing Lignin-Based Polyols through Microwave-Assisted Liquefaction for Rigid Polyurethane Foam Production. Materials 2015, 8, 586-599; doi:10.3390/ma8020586.

Yoshida, H et al., Kraft lignin in polyurethanes. II. Effects of the molecular weight of kraft lignin on the properties of polyurethanes from a kraft lignin-polyether triol-polymeric MDI system. Journal of Applied Polymer Science. 40. 1819-1832. (1990). Abstract.

Zheng, et al. Extrusion Pretreatment of Lignocellulosic Biomass: A Review. Int. J. Mol. Sci. Oct. 2014, 15, 18967-18984.

Zou, et al. Preparation of Activated Carbons from Chinese Coal and Hydrolysis Lignin. Adsorption Science & Technology. 2001; 19(1): 59-72.

\* cited by examiner

METHODS OF MAKING SPECIALIZED LIGNIN AND LIGNIN PRODUCTS FROM BIOMASS

CROSS-REFERENCE

This application claims the benefit of U.S. Provisional Application No. 62/952,383, filed on Dec. 22, 2019, which is incorporated herein by reference in its entirety.

BACKGROUND

Polymers in biomass can be difficult to extract and separate. Many diverse methods have been attempted but the results are either too expensive, too high in contaminants, or fail to achieve purified reactive compounds; thus requiring further complicated and expensive processing.

Lignin is a major component of lignocellulosic biomass and as such, it is processed in the pulp and paper industry. However, the lignin derived from these processes is mostly suitable as a fuel to produce steam and electricity, or, to a small extent, itself is a low-grade fuel. It is often degraded and doesn't have the low molecular weight of those petrochemical raw materials used in resins and other major products. More recently, with the advent of biorefineries that process biomass to ethanol and other products, other uses of lignin, in its native or modified state, are being evaluated for production of chemicals. However, most hydrolysis and separation techniques suffer from producing low yields of separated cellulose and lignin products that are not highly reactive.

There is a need for a method to efficiently extract lignin and economically produce a reactive lignin that can be a starting material incorporated as a raw material to replace petrochemical compounds.

SUMMARY

Disclosed herein, in some aspects, is a method for producing a reactive lignin from biomass, the method comprising: (a) pretreating said biomass with acid and steam explosion to produce a liquid component containing a solubilized carbohydrate and a solids component consisting of carbohydrate and lignin; (b) separating the liquid component from the solids component; (c) treating the solids component to an alkaline pH of at least pH8 to solubilize the lignin and precipitate the carbohydrate; (d) separating the solubilized lignin from the carbohydrate; (e) treating the solubilized lignin fraction to a pH of at least pH7 to precipitate a portion of the solubilized lignin; (f) separating the solubilized lignin from the precipitated lignin portion; and (g) treating the solubilized lignin to an acid pH of pH 5 or lower to precipitate the reactive lignin fraction.

In some cases, the duration of said pretreatment is less than 30 seconds. In some cases, the solubilized lignin is further separated into fractions by altering the pH. In some cases, the lignin is solubilized by alkali. In some cases, the lignin is solubilized by raising the pH of the solids fraction. In some cases, the pH is raised to a pH of about 7.5, about 8.0, about 8.5, about 9.0, about 9.5, about 10.0, about 10.5, or about 11. In some cases, the pH is raised by a chemical agent. In some cases, a chemical agent used to raise the pH is selected from the group consisting of: sodium hydroxide, calcium hydroxide, potassium hydroxide, ammonia, ammonia hydroxide, hydrogen peroxide, and a combination thereof. In some cases, the lignin is solubilized by a solvent. In some cases, the solvent is selected from the group consisting of: organosolv, an ionic liquid, and a combination thereof. In some cases, the lignin is separated from the carbohydrate by centrifugation, filtration, membrane filtration, diafiltration, or flocculation. In some cases, the lignin is separated from the reactive lignin by centrifugation, filtration, membrane filtration, diafiltration, or flocculation. In some cases, the lignin precipitated at pH 7 is separated from the remaining solubilized lignin by centrifugation, filtration, membrane filtration, diafiltration, or flocculation. In some cases, the reactive lignin is precipitated with acid. In some cases, the acid is selected from the group consisting of: sulfuric acid, peroxyacetic acid, hydrochloric acid, phosphoric acid, oxalic acid, lactic acid, formic acid, acetic acid, citric acid, benzoic acid, sulfurous acid, chloroacetic acid, dichloroacetic acid, trichloroacetic acid, and a combination thereof. In some cases, the reactive lignin is converted into foams, films or other bioproducts. In some cases, the reactive lignin is decolorized with a decolorizing agent. In some cases, the decolorizing agent is $H_2O_2$. In some cases, the biomass is selected from the group consisting of: silage, agricultural residues, corn stover, bagasse, sorghum, nuts, nut shells, coconut shells, Distillers Dried Solubles, Distillers Dried Grains, Condensed Distillers Solubles Distillers Wet Grains, Distillers Dried Grains with Solubles, woody materials, sawdust, wood chips, timber slash, mill scrap, municipal waste, waste paper, recycled toilet papers, yard clippings, and energy crops such as poplars, willows, switchgrass, alfalfa, and prairie bluestem, non-woody plant matter, cellulosic material, lignocellulosic material, hemicellulosic material, carbohydrates, corn, sugar cane, grasses, switchgrass, high biomass sorghum, bamboo, corncobs, and peels and pits. In some cases, the lignin is fractionated by enzymes instead of acid.

Disclosed herein, in some aspects, is a reactive lignin comprising: (a) a molecular weight under 3000 Da; (b) a total hydroxyl content higher than 5.00 mmol/g; (c) a sulfur content under 0.50 wt. %; and (d) an ash content below 2.0. In some cases, the lignin is washed and dried. In some cases, the lignin is decolorized. In some cases, the lignin is decolorized with $H_2O_2$.

Disclosed herein, in some aspects, is a product formed with the reactive lignin disclosed herein. In some cases, the product is selected from the group consisting of: barrier films, antimicrobial films, transparent films, flexible displays, reinforcing fillers for polymers, biomedical implants, pharmaceuticals, drug delivery, fibers and textiles, templates for electronic components, separation membranes, batteries, supercapacitors, electroactive polymers, packaging materials, and the like.

Disclosed herein, in some aspects, is a method for producing a reactive lignin fraction from biomass, the method comprising: (a) producing a pretreated slurry from biomass; (b) separating the liquid fraction from the solids fraction; (c) treating the solids fraction to an alkaline pH of at least pH8 to solubilize the lignin and precipitate the carbohydrate; (d) separating the solubilized lignin from the carbohydrate; (e) treating the solubilized lignin fraction to an alkaline pH of at least pH7 to precipitate a portion of the solubilized lignin; (f) separating the solubilized lignin from the precipitated lignin portion; and (g) treating the solubilized lignin to an alkaline pH of pH 5 or lower to precipitate the reactive lignin fraction.

Disclosed herein, in some aspects, is a system for producing a reactive lignin from biomass, the system comprising: (a) pretreating said biomass with acid and steam explosion to produce a liquid component containing a solubilized carbohydrate and a solids component consisting of carbohydrate and lignin; (b) separating the liquid component from the solids component; (c) treating the solids component to an alkaline pH of at least pH8 to solubilize the lignin and precipitate the carbohydrate; (d) separating the solubilized lignin from the carbohydrate; (e) treating the solubilized lignin fraction to an alkaline pH of at least pH7 to precipitate a portion of the solubilized lignin; (f) separating the solubilized lignin from the precipitated lignin portion; and (g) treating the solubilized lignin to an alkaline pH of pH 5 or lower to precipitate the reactive lignin fraction.

In some cases, the duration of said pretreatment is less than 30 seconds. In some cases, the solubilized lignin is further separated into fractions by altering the pH. In some cases, the lignin is solubilized by alkali. In some cases, the lignin is solubilized by raising the pH of the solids fraction. In some cases, the pH is raised to a pH of about 7.5, about 8.0, about 8.5, about 9.0, about 9.5, about 10.0, about 10.5, or about 11. In some cases, the pH is raised by a chemical agent. In some cases, a chemical agent used to raise the pH is any one or more of the compounds consisting of; sodium hydroxide, calcium hydroxide, potassium hydroxide, ammonia, ammonia hydroxide, hydrogen peroxide or a combination thereof. In some cases, the lignin is solubilized by a solvent. In some cases, the solvent is selected from the group consisting of; organosolv, an ionic liquid, or a combination thereof. In some cases, the lignin is separated from the carbohydrate by centrifugation, filtration, membrane filtration, diafiltration, or flocculation. In some cases, the lignin is separated from the reactive lignin by centrifugation, filtration, membrane filtration, diafiltration, or flocculation. In some cases, the lignin precipitated at pH 7 is separated from the remaining solubilized lignin by centrifugation, filtration, membrane filtration, diafiltration, or flocculation. In some cases, the reactive lignin is precipitated with acid. In some cases, the acid is selected from the group consisting of: sulfuric acid, peroxyacetic acid, hydrochloric acid, phosphoric acid, oxalic acid, lactic acid, formic acid, acetic acid, citric acid, benzoic acid, sulfurous acid, chloroacetic acid, dichloroacetic acid, trichloroacetic acid, or a combination thereof. In some cases, the reactive lignin is converted into foams, films or other bioproducts. In some cases, the reactive lignin is decolorized with a decolorizing agent. In some cases, the decolorizing agent is $H_2O_2$. In some cases, the biomass is selected from the group consisting of: silage, agricultural residues, com stover, bagasse, sorghum, nuts, nut shells, coconut shells, Distillers Dried Solubles, Distillers Dried Grains, Condensed Distillers Solubles Distillers Wet Grains, Distillers Dried Grains with Solubles, woody materials, sawdust, wood chips, timber slash, mill scrap, municipal waste, waste paper, recycled toilet papers, yard clippings, and energy crops such as poplars, willows, switchgrass, alfalfa, and prairie bluestem, non-woody plant matter, cellulosic material, lignocellulosic material, hemicellulosic material, carbohydrates, corn, sugar cane, grasses, switchgrass, high biomass sorghum, bamboo, corncobs, and peels and pits. In some cases, the lignin is washed and dried. In some cases, the lignin is decolorized. In some cases, lignin is decolorized with $H_2O_2$. In some cases, the lignin is fractionated by enzymes instead of acid.

Disclosed herein, in some aspects, is a reactive lignin produced from the system disclosed herein, comprising: (a) a molecular weight under 3000 Da; (b) a total hydroxyl content higher than 5.00 mmol/g; (c) a sulfur content under 0.50 wt. %; and (d) an ash content below 2.0.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1A:
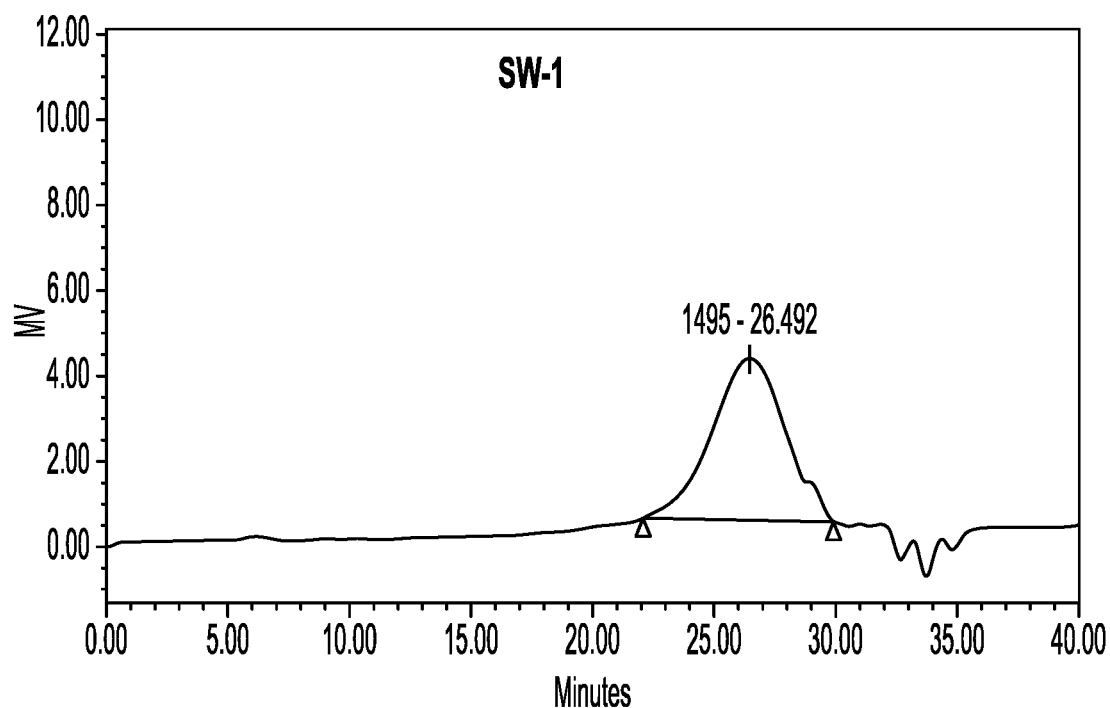
FIGS. 1A-1B are graphs of the GPC results of SW-1 (FIG. 1A) and Low (FIG. 1B).

As used in the specification and the appended claims, the singular forms "a," "an" and "the" include plural referents unless the context clearly dictates otherwise. Thus, for example, reference to "a purified monomer" includes mixtures of two or more purified monomers. The term "comprising" as used herein is synonymous with "including," "containing," or "characterized by," and is inclusive or open-ended and does not exclude additional, unrecited elements or method steps.

"About" means a referenced numeric indication plus or minus 10% of that referenced numeric indication. For example, the term about 4 would include a range of 3.6 to 4.4. All numbers expressing quantities of ingredients, reaction conditions, and so forth used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Wherever the phrase "for example," "such as," "including" and the like are used herein, the phrase "and without limitation" is understood to follow unless explicitly stated otherwise. Therefore, "for example ethanol production" means "for example and without limitation ethanol production.

Disclosed herein is a reactive lignin that is uniform, low molecular weight, with a high hydroxyl content made by an industrially applicable, simple, and low-cost method of acid steam hydrolysis. The process of pretreatment and separation is rapid and utilizes economical chemistry. The lignin so described has many industrial applications, especially as a substitute in phenolic compositions.

Lignocellulosic feedstocks are an economically viable source for bioproducts as they are abundant and can be converted into fuels and biochemical as the long chain polymers or hydrolyzed into oligomer or monomer sugars. Cellulose, hemicellulose and lignin are not uniformly distributed within the cell walls. The structure and the quantity of these plant cell wall components vary according to species, tissues and maturity of the plant cell wall. Generally, lignocellulosic biomass consists of 35-50% cellulose, 20-35% hemicellulose, and 10-25% lignin. Proteins, oils, and ash make up the remaining fractions.

Lignocellulosic biomass, including wood, can require high temperatures to depolymerize the sugars contained within and, in some cases, explosion and more violent reaction with steam (explosion) and/or acid to make the biomass ready for enzyme hydrolysis. The C5 and C6 sugars are naturally embedded in and cross-linked with lignin, extractives and phenolics. The high temperature and pressures can result in the leaching of lignin and aromatics, loading with mixed sugars, high ash, lignin aromatic fragments, inhibitors, and acids in stream. Further enzymatic hydrolysis converts most of the sugars to product valuable feedstock that can be further processed to ethanol or another alcohol, and a variety of other biochemical and bioproducts. After solubilization, the lignin can be separated from the cellulose. Separation of the lignin residues can be accomplished via flocculation, filtration, and/or centrifugation, or other methods. The extracted lignin residues can contain small amounts of ash, enzymes, sulfur, sugars, and other products.

When processing biomass to harvest valuable sugar streams, the remaining lignin-rich residues (lignin material) and carbohydrate remaining after separation of most of the streams are products that, to date, have been more difficult to extract, separate and hydrolyze. They have found few economical uses, partly because of low yields and impurities. For example, Lignin is burned as an energy source to produce the heat and pressure necessary to pretreat biomass, or as a feedstock for cattle and other livestock. Separation of the crystalline or amorphous C6 polymers from lignin is difficult and costly.

Further, all of these types of processes, whether the biomass feedstock is the whole or partial plant, or produced by an extraction process through chemical pulping process such as the black liquor from the Kraft process, or steam-explosion, high-temperature pyrolysis, Organosolv process, or another method, can result in long polymer fibers and a high ash content, and often, as in the case of pyrolysis, a condensed material. See, e.g., U.S. Publication 2015/0197424 A1. The lignin produced by these processes is not nearly as readily reactive as a lignin with a low ash and low sulfur and considerable oxygen content.

The acid hydrolysis process described herein (e.g., U.S. Pat. No. 10,844,413) is much faster and more effective than traditional pretreatment processes, and further processing steps remove other impurities such acids, sugars and other residues, yielding a refined clean lignin. These sugars and sugar polymers are cleaner can be used to make useful end-products such as biofuels and bioplastics. Further, the homogenous and consistently small particle size of the starting material (ensuring the carbohydrate and lignin residues have a small particle size), are derived through the removal of the amorphous cellulose and hemicellulose.

In this specification and in the claims that follow, reference will be made to a number of terms which shall be defined to have the following meanings.

Definitions

"Optional" or "optionally" means that the subsequently described event or circumstance may or may not occur, and that the description includes instances where said event or circumstance occurs and instances where it does not. For example, the phrase "the medium can optionally contain glucose" means that the medium may or may not contain glucose as an ingredient and that the description includes both media containing glucose and media not containing glucose.

Unless characterized otherwise, technical and scientific terms used herein have the same meaning as commonly understood by one of ordinary skill in the art.

"Fermentive end-product" and "fermentation end-product" are used interchangeably herein to include biofuels, chemicals, compounds suitable as liquid fuels, gaseous fuels, triacylglycerols, reagents, chemical feedstocks, chemical additives, processing aids, food additives, bioplastics and precursors to bioplastics, and other products.

Fermentation end-products can include polyols or sugar alcohols; for example, methanol, glycol, glycerol, erythritol, threitol, arabitol, xylitol, ribitol, mannitol, sorbitol, dulcitol, fucitol, iditol, inositol, volemitol, isomalt, maltitol, lactitol, and/or polyglycitol.

The term "fatty acid comprising material" as used herein has its ordinary meaning as known to those skilled in the art and can comprise one or more chemical compounds that include one or more fatty acid moieties as well as derivatives of these compounds and materials that comprise one or more of these compounds. Common examples of compounds that include one or more fatty acid moieties include triacylglycerides, diacylglycerides, monoacylglycerides, phospholipids, lysophospholipids, free fatty acids, fatty acid salts, soaps, fatty acid comprising amides, esters of fatty acids and monohydric alcohols, esters of fatty acids and polyhydric alcohols including glycols (e.g. ethylene glycol, propylene glycol, etc.), esters of fatty acids and polyethylene glycol, esters of fatty acids and polyethers, esters of fatty acids and polyglycol, esters of fatty acids and saccharides, esters of fatty acids with other hydroxyl-containing compounds, etc.

The term "pH modifier" as used herein has its ordinary meaning as known to those skilled in the art and can include any material that will tend to increase, decrease or hold steady the pH of the broth or medium. A pH modifier can be an acid, a base, a buffer, or a material that reacts with other materials present to serve to raise, lower, or hold steady the pH. In one embodiment, more than one pH modifier can be used, such as more than one acid, more than one base, one or more acid with one or more bases, one or more acids with one or more buffers, one or more bases with one or more buffers, or one or more acids with one or more bases with one or more buffers. In one embodiment, a buffer can be produced in the broth or medium or separately and used as an ingredient by at least partially reacting in acid or base with a base or an acid, respectively. When more than one pH modifiers are utilized, they can be added at the same time or at different times. In one embodiment, one or more acids and one or more bases are combined, resulting in a buffer. In one embodiment, media components, such as a carbon source or a nitrogen source serve as a pH modifier; suitable media components include those with high or low pH or those with buffering capacity. Exemplary media components include acid- or base-hydrolyzed plant polysaccharides having residual acid or base, ammonia fiber explosion (AFEX) treated plant material with residual ammonia, lactic acid, corn steep solids or liquor.

The term "lignin" as used herein has its ordinary meaning as known to those skilled in the art and can comprise a cross-linked organic, racemic phenol polymer with molecular masses in excess of 10,000 Daltons that is relatively hydrophobic and aromatic in nature. Its degree of polymerization in nature is difficult to measure, since it is fragmented during extraction and the molecule consists of various types of substructures that appear to repeat in a haphazard manner. There are three monolignol monomers, methoxylated to various degrees: p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. All lignins contain small amounts of incomplete or modified monolignols, and other monomers are prominent in non-woody plants. Lignins are one of the main classes of structural materials in the support tissues of vascular and nonvascular plants and even some algae. Lignins are particularly important in the formation of cell walls, especially in wood and bark.

The term "plant polysaccharide" as used herein has its ordinary meaning as known to those skilled in the art and can comprise one or more polymers of sugars and sugar derivatives as well as derivatives of sugar polymers and/or other polymeric materials that occur in plant matter. Exemplary plant polysaccharides include cellulose, starch, pectin, and hemicellulose. Others are chitin, sulfonated polysaccharides such as alginic acid, agarose, carrageenan, porphyran, furcelleran and funoran. Generally, the polysaccharide can have two or more sugar units or derivatives of sugar units. The sugar units and/or derivatives of sugar units can repeat in a regular pattern, or otherwise. The sugar units can be hexose units or pentose units, or combinations of these. The derivatives of sugar units can be sugar alcohols, sugar acids, amino sugars, etc. The polysaccharides can be linear, branched, cross-linked, or a mixture thereof. One type or class of polysaccharide can be cross-linked to another type or class of polysaccharide.

The term "saccharification" as used herein has its ordinary meaning as known to those skilled in the art and can include conversion of plant polysaccharides to lower molecular weight species that can be utilized by the organism at hand. For some organisms, this would include conversion to monosaccharides, disaccharides, trisaccharides, and oligosaccharides of up to about seven monomer units, as well as similar sized chains of sugar derivatives and combinations of sugars and sugar derivatives.

The term "biomass" as used herein has its ordinary meaning as known to those skilled in the art and can include one or more carbonaceous biological materials that can be converted into a biofuel, chemical or other product. Biomass as used herein is synonymous with the term "feedstock" and includes silage, agricultural residues (corn stalks, grass, straw, grain hulls, bagasse, etc.), nuts, nut shells, coconut shells, animal waste (manure from cattle, poultry, and hogs), Distillers Dried Solubles, Distillers Dried Grains, Condensed Distillers Solubles, Distillers Wet Grains, Distillers Dried Grains with Solubles, woody materials (wood or bark, sawdust, wood chips, timber slash, and mill scrap), municipal waste (waste paper, recycled toilet papers, yard clippings, etc.), and energy crops (poplars, willows, switchgrass, alfalfa, prairie bluestem, algae, including macroalgae such as members of the Chlorophyta, Phaeophyta, Rhodophyta, etc.). One exemplary source of biomass is plant matter. Plant matter can be, for example, woody plant matter, non-woody plant matter, cellulosic material, lignocellulosic material, hemicellulosic material, sugar cane, grasses, switchgrass, sorghum, high biomass sorghum, bamboo, algae and material derived from these. Plants can be in their natural state or genetically modified, e.g., to increase the cellulosic or hemicellulosic portion of the cell wall, or to produce additional exogenous or endogenous enzymes to increase the separation of cell wall components. Plant matter can be further described by reference to the chemical species present, such as proteins, polysaccharides and oils. Polysaccharides include polymers of various monosaccharides and derivatives of monosaccharides including glucose, fructose, lactose, galacturonic acid, rhamnose, etc. Plant matter also includes agricultural waste byproducts or side streams such as pomace, corn steep liquor, corncobs, corn fiber, corn steep solids, distillers' grains, peels, pits, fermentation waste, straw, lumber, sewage, garbage and food leftovers. Peels can be citrus which include, but are not limited to, tangerine peel, grapefruit peel, orange peel, tangerine peel, lime peel and lemon peel. These materials can come from farms, forestry, industrial sources, households, etc. Another non-limiting example of biomass is animal matter, including, for example milk, bones, meat, fat, animal processing waste, and animal waste. "Feedstock" is frequently used to refer to biomass being used for a process, such as those described herein.

"Concentration" when referring to material in the broth or in solution generally refers to the amount of a material present from all sources, whether made by the organism or added to the broth or solution. Concentration can refer to soluble species or insoluble species, and is referenced to either the liquid portion of the broth or the total volume of the broth, as for "titer." When referring to a solution, such as "concentration of the lignin in solution", the term indicates increasing one or more components of the solution through evaporation, filtering, extraction, etc., by removal or reduction of a liquid portion.

"Pretreatment" or "pretreated" is used herein to refer to any mechanical, chemical, thermal, biochemical process or combination of these processes whether in a combined step or performed sequentially, that achieves disruption or expansion of the biomass so as to render the biomass more susceptible to attack by enzymes and/or microbes, and can include the enzymatic hydrolysis of released carbohydrate polymers or oligomers to monomers. In one embodiment, pretreatment includes removal or disruption of lignin so as to make the cellulose and hemicellulose polymers in the plant biomass more available to cellulolytic enzymes and/or microbes, for example, by treatment with acid or base. In one embodiment, pretreatment includes disruption or expansion of cellulosic and/or hemicellulosic material. In another embodiment, it can refer to starch release and/or enzymatic hydrolysis to glucose. Steam explosion, and ammonia fiber expansion (or explosion) (AFEX) are well known thermal/chemical techniques. Hydrolysis, including methods that utilize acids, bases, and/or enzymes can be used. Other thermal, chemical, biochemical, enzymatic techniques can also be used.

"Sugar compounds", "sugar streams" or "carbohydrate" is used herein to indicate mostly polysaccharide or monosaccharide sugars, dissolved, crystallized, evaporated, or partially dissolved, including but not limited to hexoses and pentoses; sugar alcohols; sugar acids; sugar amines; compounds containing two or more of these linked together directly or indirectly through covalent or ionic bonds; and mixtures thereof. Included within this description are disaccharides; trisaccharides; oligosaccharides; polysaccharides; and sugar chains, branched and/or linear, of any length. A sugar stream can consist of primarily or substantially C6 sugars, C5 sugars, or mixtures of both C6 and C5 sugars in varying ratios of said sugars. C6 sugars have a six-carbon molecular backbone and C5 sugars have a five-carbon molecular backbone.

As intended herein, a "liquid" composition may contain solids and a "solids" composition may contain liquids. A liquid composition refers to a composition in which the material is primarily liquid, and a solids composition is one in which the material is primarily solid.

Lignin is a natural amorphous polymer made up of substituted aromatic structures. At the highest level, two types of lignin are recognized: 1) native lignin, which is lignin as it is present in biomass, and 2) technical lignin, which is lignin isolated from biomass through various processes. Several lignin review articles detail various areas of lignin structure, both native and technical. See, for example, Holladay, J E, et al., "Top Value Added chemicals from Biomass", (2007). vol. II, Pacific Northwest National Laboratory (PNNL) and the National Renewable Energy Laboratory (NREL) herein incorporated by reference in its entirety. Lignin's structure leads to processing challenges which differ significantly from those presented by more homogeneous feedstocks such as carbohydrate polymers.

Lignin is a natural amorphous polymer made up of randomly branched and crosslinked aromatic units that helps hold plant cell walls together. Through crosslinking with cellulose carbohydrates, lignin confers strength, rigidity and flexibility, as well as aiding in water transport and imparting a measure of protection against attack by marauding insects and microorganisms. Many structures have been proposed for native lignin as it is found in nature, but these are approximations since the structure varies in plants. Additionally, the methods used for lignin extraction and isolation frequently modify its native structure. The composition, molecular weight and amount of lignin available will differ significantly from a solvent-based, sulfite pulping, a Kraft-type pulping, biorefinery, acid, or other type of extraction process. Thus, lignin's structure leads to processing challenges. It is important to recognize that native lignin undergoes profound structural changes and dramatic modification of molecular weight profiles depending on the isolation technology employed.

Regardless of its complexity, lignin's unifying structural feature is a branched and crosslinked network of C9 phenylpropenyl units. Biosynthetically, these C9 units are provided by the enzymatic dehydrogenative polymerization of coumaryl alcohol, coniferyl alcohol, and sinapyl alcohol. Coniferyl and sinapyl alcohol are the starting points for the formation of the well-known guaiacyl and syringyl structures of lignin and the proportion of these depends on the lignin source.

The acid and steam explosion process described herein to extract biomass components is a rapid treatment process that releases over 80% of the lignin available in the feedstock. The treatment is carried out by reducing the particle size to small, uniform pieces of approximately 0.1 μm to 10 μm and further reducing the size as the particles are treated to pressurized acid hydrolysis and high temperatures, then subjected to steam explosion. Because the whole process is uniform throughout and only takes seconds, there is little inhibitor and ash formation in the resulting pretreated material. The yields of both carbohydrates, sugars and lignin are high.

A rapid extruder pretreatment system, such as described in U.S. Pat. No. 10,844,413 or WO2018/151833 (A1), each incorporated herein by reference in its entirety, offers a unique pathway for the deconstruction of biomass and release of lignin from other biomass components. The combination of mechanical fibrillation, dilute acid hydrolysis, and steam explosion, all accomplished in under 20 seconds, yields a very clean slurry of soluble sugars, microcrystalline cellulose, and lignin. The short, yet intense, treatment duration yields a unique lignin product that has been rendered into a highly reactive state without the condensing or sulfonation that occurs in most other processes.

As part of this production pathway, up to 80% of the lignin particulates generated after pretreatment are solubilized into solution via a simple pH raise. A base (NaOH, or other alkaline solution) is used to elevate the pH to 10, 10.5, 11, 11.5, or higher to dissolve the lignin into an aqueous solution. Then the pH is lowered, preferably by an acid such a sulfuric acid, to sequentially remove precipitating lignin fractions. In some instances, the pH can be lowered to neutral pH or acidic pH, for example, a pH of 7.0, 6.5, 6.0, 5.5, 5.0, 4.5, 4.0, 3.0, 2.0, 2.5, 1.0 or lower. In some embodiments, the pH is lowered and/or maintained within a range of about pH 4.5 to about 7.1, or about 4.5 to about 6.9, or about pH 5.0 to about 6.3, or about pH 5.5 to about 6.3, or about pH 6.0 to about 6.5, or about pH 5.5 to about 6.9 or about pH 6.2 to about 6.7. Acids suitable for this process include hydrochloric (HCL) acid, sulfuric ($H_2SO_4$) acid, nitric acid ($HNO_3$), carbonic acid ($H_2CO_3$), uric acid, ascorbic acid, citric acid, acetic acid, oxalic acid, hydrofluoric acid, and the like.

It is well known that by lowering the pH of an aqueous lignin solution it is possible to precipitate solid lignin back out of solution. See, for example, EP 88309712.3, WO2013/083876 A3, or US2004/0244925 A1 each herein incorporated by reference in its entirety. In one embodiment lowering the pH step-wise and extracting the fraction of lignin that precipitates out at each step can act as a fractionation step that allows the separation of lignin fractions that have distinct molecular weight, molar mass, polydispersity index, and hydroxyl group content. This is a quick and effective way to selectively tune lignin characteristics for use in specialty applications. Additionally, using lignin fractions produced from rapid, uniform pretreatment results in a reactive lignin that is low in sulfur, ash, and carbohydrate. "Reactive lignin" as used herein refers to a lignin with a molecular weight less than 3000 Da, a molar mass less than 1700, a high hydroxyl group content or polydispersity index (PDI), a sulfur content less than 2.5%. This particular reactive lignin tends to precipitate between a pH of 7 and 3.5 from solubilized lignin solutions; however, depending on the pretreatment, this pH range could vary somewhat, for example, a pH of 9 and 3.5. In some embodiments, reactive lignin fractions have a molecular weight less than 2000 and a hydroxyl content that is more than double that of other fractions tested. The lignin fractions may be in the form of a slurry, a solution in which the lipid is dissolved, or as a dry powder.

Reactive lignin, as described herein, is a more uniform lignin, and because of its characteristics, it is very suitable for polymeric resin application. The polymer applications for this reactive lignin are extensive and include: precursors for low-cost carbon fiber, polymer additive and blending agent, surfactants for pesticides, component for inherently conducting polymers, macromonomers in polyester, use in cement, urethane and epoxy polymers, components in polymer blends and alloys, precursors to a new generation of polyols, replacement of phenol-formaldehyde and urea-formaldehyde foams, sealants and adhesive resins, to name a few. The advantages are a low-cost component with improved heat resistance, water resistance and biodegradability.

In some variations, this disclosure provides a composition comprising fractions of lignin comprising distinctive molecular weight, molar mass, polydispersity index and hydroxyl group content. In some embodiments, the lignin is a very low-molecular weight lignin with a molecular weight less than 2500 Da and a highly reactive state without the condensing or sulfonation that occurs in most other processes.

Description

The following description and examples illustrate some exemplary embodiments of the disclosure in detail. Those of skill in the art will recognize that there are numerous variations and modifications of this disclosure that are encompassed by its scope. Accordingly, the description of a certain exemplary embodiment should not be deemed to limit the scope of the present disclosure.

In the process system, a biomass feedstock is pretreated through an extruder system wherein the particle size of the biomass is reduced substantially, and the resulting product is subjected to uniform elevated temperature and pressure under acid conditions, then steam explosion also simultaneously. The C5 polymers and portions of the cellulose (C6 polymers) are hydrolyzed and separated from the pretreated stream. The pH in the resulting cellulose/lignin slurry is then elevated to solubilize the lignin which is then removed from the cellulose portion. The solubilized lignin product can be further fractionated. For example, it can be taken through a process developed by MetGen (MetGen Oy, Finland) for use in many industrial purposes. The clean cellulose is collected and used as a platform product to create further bioproducts.

The object of this disclosure is to find an efficient and economical way to create a lignin for the production of high value products while minimizing the number of individual processing steps required. Initially, the solubilized lignin and carbohydrates are separated following pretreatment. The pH is adjusted prior to separation so that the majority of the salts are included in the C5 rich stream. It is important to minimize the carryover of soluble sugars, so a two-stage separation is employed to wash out as much of the sugar as possible. The sugar from the first separation is then forwarded to a concentration step, followed by an optional clarification step. This yields a very high quality C5-rich sugar stream with low inhibitor levels that could be used for a variety of products such as xylitol formation, fuels, etc. Following the first separation, the solids are re-slurried with fresh water and a second separation step is used to wash the cellulose/lignin solids. The dilute sugar stream can be incorporated in an internal recycle scenario to dilute the pretreated material prior to the initial separation (this captures most of the sugars).

Thus, this pretreatment system combines up to three separate steps that traditional methodologies need to implement: hemicellulose solubilization, fibrillation (particle downsizing), and amorphous cellulose removal (usually done with a separate acid or enzyme-based process), into one simple step in the system.

The cleaned cellulose/lignin material is diluted and the pH raised to solubilize the lignin. An additional solid/liquid separation removes the precipitated cellulose, and the solubilized lignin can be used to produce other products, either in a soluble form (for films, etc.) and/or further fractionated and collected as described infra.

The reactive surface of —OH side groups in lignin facilitates grafting chemical species to achieve different surface properties. Surface functionalization allows the tailoring of particle surface chemistry to facilitate self-assembly, controlled dispersion within a wide range of matrix polymers, and control of both the particle and particle-matrix bond strength. Composites may be transparent, have tensile strengths greater than cast iron, and have very low coefficient of thermal expansion. Potential applications include, but are not limited to, barrier films, antimicrobial films, transparent films, flexible displays, reinforcing fillers for polymers, biomedical implants, pharmaceuticals, drug delivery, fibers and textiles, templates for electronic components, separation membranes, batteries, supercapacitors, electroactive polymers, and many others.

Feedstock and Pretreatment of Feedstock

In one embodiment, the feedstock (biomass) contains lignocellulosic material. The feedstock can be derived from agricultural crops, crop residues, trees, woodchips, sawdust, paper, cardboard, grasses, algae, municipal waste and other sources.

Mechanical processes can reduce the particle size of the biomass material so that it can be more conveniently handled in the bioprocess and can increase the surface area of the feedstock to facilitate contact with chemicals/biochemicals/biocatalysts. Mechanical processes can also separate one type of biomass material from another. The biomass material can also be subjected to thermal and/or chemical pretreatments to render plant polymers more accessible. Multiple steps of treatment can also be used.

Mechanical processes include, are not limited to, washing, soaking, milling, grinding, size reduction, screening, shearing, size classification and density classification processes. Chemical processes include, but are not limited to, bleaching, oxidation, reduction, acid treatment, base treatment, sulfite treatment, acid sulfite treatment, basic sulfite treatment, ammonia treatment, and hydrolysis. Thermal processes include, but are not limited to, sterilization, steam explosion, holding at elevated temperatures, pressurized or unpressurized, in the presence or absence of water, and freezing. Biochemical processes include, but are not limited to, treatment with enzymes, including enzymes produced by genetically-modified plants or organisms, and treatment with microorganisms.

Various enzymes that can be utilized include cellulase, amylase, -glucosidase, xylanase, gluconase, and other polysaccharases; lysozyme; laccase, and other lignin-modifying enzymes; lipoxygenase, peroxidase, and other oxidative enzymes; proteases; and lipases. One or more of the mechanical, chemical, thermal, thermochemical, and biochemical processes can be combined or used separately. Such combined processes can also include those used in the production of paper, cellulose products, microcrystalline cellulose, and cellulosics and can include pulping, kraft pulping, acidic sulfite processing. The feedstock can be a side stream or waste stream from a facility that utilizes one or more of these processes on a biomass material, such as cellulosic, hemicellulosic or lignocellulosic material. Examples include paper plants, cellulosics plants, distillation plants, cotton processing plants, and microcrystalline cellulose plants. The feedstock can also include cellulose-containing or cellulosic containing waste materials. The feedstock can also be biomass materials, such as wood or grasses, produced or harvested as an intended feedstock for production of ethanol or other products such as by biocatalysts.

In another embodiment, a method can utilize a pretreatment process disclosed in U.S. Patents and Patent Applications US20040152881, US20040171136, US20040168960, US20080121359, US20060069244, US20060188980, US20080176301, U.S. Pat. Nos. 5,693,296, 6,262,313, US20060024801, U.S. Pat. Nos. 5,969,189, 6,043,392, US20020038058, U.S. Pat. Nos. 5,865,898, 5,865,898, 6,478,965, 5,986,133, or US20080280338, each of which is incorporated by reference herein in its entirety.

In one embodiment, pretreatment of biomass comprises dilute acid hydrolysis. Examples of dilute acid hydrolysis treatment are disclosed in T. A Lloyd and C. E Wyman, Bioresource Technology, (2005) 96, 1967, incorporated by reference herein in its entirety.

In another embodiment, pretreatment of biomass comprises pH controlled liquid hot water treatment. Examples of pH controlled liquid hot water treatments are disclosed in N. Mosier et al., Bioresource Technology, (2005) 96, 1986, incorporated by reference herein in its entirety.

In one embodiment, the methods of this disclosure have two steps: a pretreatment step that leads to a wash stream, and a solublization/separation step of pretreated-biomass that produces a solubilized lignin stream. In this method, the pH at which the pretreatment step is carried out includes acid hydrolysis, hot water pretreatment, steam explosion. Dilute acid and hot water treatment methods solubilize mostly hemicellulose and amorphous cellulose during the pretreatment step. As a result, the wash stream from the product of pretreatment step in the contains primarily hemicellulose-based sugars, with a lesser fraction of amorphous cellulose-derived sugars. The subsequent alkaline solubilization of the residual biomass leads to a crystalline C6 solids phase and a solubilized lignin stream. In one embodiment, the material is additionally treated to a separation step to remove the lignin and other solubilized impurities from the cellulose solids. The cellulose can be further treated to decolorize the material.

In one embodiment, solubilization step comprises ionic liquid (IL) treatment. Pretreated solids can be solubilized with an ionic liquid, followed by IL extraction with a wash solvent such as alcohol or water. The treated material can then be separated from the ionic liquid/wash-solvent solution by centrifugation or filtration, and further processed.

Production of Reactive Lignin

The extruder-based, rapid pretreatment system process is used to downsize biomass to a very small particle size, through a fibrillation step prior to any chemical treatment. See PCT/US2015/064850, incorporated herein by reference. During the chemical conversion process in the system, the biomass is further reduced in size to a mixture of particles having an initial, uniform, or substantially uniform size ranging from 1 μm to a little over 100 μm. Further, the particle size of the suspended solids exiting the system can be controlled.

The suspended solids are all primarily in the micron size range, and the majority of the hemicellulose and amorphous cellulose have been removed from the solid substrate, meaning that there is easy access to the lignin fraction for alkaline solubilization. Additionally, once the lignin is solubilized, a cellulosefraction remains that requires no further mechanical or enzymatic processing to yield, for example, a cellulose product. Further, due to the nature of the extruder and processing structure of the zones and screws within the extruder, these particles are treated in a homogeneous manner, all being subjected to an even temperature, pressure and acid concentration. Thus few inhibitors are formed and pretreatment proceeds rapidly, within a few seconds. The separation of biomass components is more complete with higher yields than other known methods of pretreatment.

In one embodiment, the pretreated material exits the system as a slurry consisting of a liquid fraction and a solid fraction. The solids and liquids can be separated utilizing a wide variety of commercially available solid/liquid separation technologies (e.g. centrifuge, rotary press, filter press, belt filter press, decanting, flocculation etc.) yielding a liquid stream that contains soluble C5 and C6 sugar monomers and/or oligomers, acetic acid, low levels of sugar degradation products such as furfural and HMF, and salts associated with acid used in pretreatment and the base used to neutralize the slurry prior to separation. The solid fraction primarily consists of micron-sized cellulose and lignin and can proceed to the lignin recovery step.

In one embodiment, to isolate the cellulose, the solids are reslurried and a base solution is added (e.g. sodium hydroxide, ammonium hydroxide, potassium hydroxide, lime, etc.). The lignin is very accessible after the pretreatment step and it is easily solubilized at pH above 10. After solublization, the lignin fraction is removed with an alkaline wash and a solid/liquid separation step. The soluble lignin is a clean, non-sulfonated and low ash product that is readily available to be further processed into a valuable co-product. The cellulose fraction is in a microcrystalline form that can then be refined using standard techniques into a finished product.

There are several advantages to this method over the prior art. Following the pretreatment, the solubilized hemicellulose and amorphous cellulose is removed in a liquid stream as soluble C5 and C6 sugars. There is also the added benefit of removing the majority of salts and sugar degradation by-products along with the liquid stream. The lignin fraction is not solubilized along with the hemicellulose (as often carried out in the prior art), so this C5-rich stream can be readily used as a feedstock for biofuel or biochemical production without requiring a separate lignin removal step. This is very unique in the industry.

After the removal of the soluble fractions, the suspended solids, consisting primarily of cellulose and a unique, non-sulfonated lignin are in an optimal state for recovery. There is no need for a step to reduce the amount of sulfur in the product which is a great advantage over the Kraft or sulfite pulping methodology. The mean particle size of the suspended solids ranges from approximately 0.1 microns to about 60 microns depending upon chosen processing conditions. This material has had the majority of the hemicellulose removed as well as a good portion of the amorphous cellulose, thus allowing for the rapid and efficient solubilization of the lignin fraction under alkaline conditions.

Most of the prior art utilizes elevated pressure and temperatures above 100° C. to solubilize lignin. In this disclosure, a wide variety of base solutions can solubilize the lignin fraction over pH 8 at atmospheric pressures and temperatures below 100° C. In one embodiment, the temperatures can vary from room temperature to over 80° C. In another embodiment, the temperature is 30° C., 35° C., 40° C., 45° C., 50° C., 55° C., 60° C., 65° C., 70° C., 75° C., or 80° C. Once this liquid lignin stream is separated out, the resulting cellulose is in a microcrystalline state and easily extracted. The majority of the amorphous cellulose has already been solubilized and removed in the pretreatment step. It is a simple process to adjust the pH to pH 7 and quickly remove the lignin fraction (SW-2) that precipitates. Then the pH of the remaining solubilized reactive lignin solution is lowered to pH 5, and the precipitated lignin component (SW-1) is removed and dried for further use. The reactive lignin has a low sulfur content and it can be further refined into a high value co-product. Additional steps to remove ash or other impurities can be taken prior to using SW-1 in chemical applications, depending on the need for a very pure product. It is expected, for most applications, the reactive lignin can be incorporated as is.

In another embodiment, the lignin/carbohydrate slurry can be fractionated by dropping the pH from 11.5 to 9 with an acid, such as $H_2SO_4$, to precipitate the high molecular weight lignin. The lignin is then freeze-dried and $H_2SO_4$ added to a pH of 2.8-2.9 for ash reduction. The precipitate is further mixed with water, then centrifuged and washed with water again to a final pH of 3.3. The lignin slurry can be freeze-dried again, further washed with water to a final pH of 3.4, yielding a low-ash low molecular weight lignin.

The solubilized lignin can also be fractionated with enzymes such as those provided by MetGen Oy, Finland. Before or after the lignin stream has been separated from the carbohydrate, specialized enzymes can be used to isolate reactive lignin streams. These enzymes work in a range of pH 3-11, and can extract and modify molecule size of fully solubilized lignin.

Pretreatment and cost-effective separation techniques combine extrusion-based fibrillation of biomass fibers with rapid solubilization of hemicellulose as well as amorphous cellulose to create a biomass slurry that is extremely well suited to further processing into a reactive lignin product. Once the lignin has been recovered, it can be washed and refined into varying qualities of product. It can be decolorized, if necessary, with compounds such as $H_2O_2$, or the like.

Alteration of the pH of a pretreated feedstock can be accomplished by washing the feedstock (e.g., with water) one or more times to remove an alkaline or acidic substance, or other substance used or produced during pretreatment. Washing can comprise exposing the pretreated feedstock to an equal volume of water 1, 2, 3, 4, 5, 6, 7, 8, 9, 10, 11, 12, 13, 14, 15, 16, 17, 18, 19, 20, 21, 22, 23, 24, 25 or more times. In another embodiment, a pH modifier can be added. For example, an acid, a buffer, or a material that reacts with other materials present can be added to modulate the pH of the feedstock. In one embodiment, more than one pH modifier can be used, such as one or more bases, one or more bases with one or more buffers, one or more acids, one or more acids with one or more buffers, or one or more buffers. When more than one pH modifiers are utilized, they can be added at the same time or at different times. Other non-limiting exemplary methods for neutralizing feedstocks treated with alkaline substances have been described, for example in U.S. Pat. Nos. 4,048,341, 4,182,780, and 5,693, 296.

Pretreatments

In one pretreatment embodiment, one or more acids can be combined, resulting in a buffer. Suitable acids and buffers that can be used as pH modifiers include any liquid or gaseous acid that is compatible with the microorganism. Non-limiting examples include peroxyacetic acid, sulfuric acid, lactic acid, citric acid, phosphoric acid, and hydrochloric acid. In some instances, the pH can be lowered to neutral pH or acidic pH, for example a pH of 7.0, 6.5, 6.0, 5.5, 5.0, 4.5, 4.0, 3.0, 2.0, 2.5, 1.0 or lower. In some embodiments, the pH is lowered and/or maintained within a range of about pH 3.5 to about 7.1, or about 4.5 to about 6.9, or about pH 5.0 to about 6.3, or about pH 5.5 to about 6.3, or about pH 6.0 to about 6.5, or about pH 5.5 to about 6.9 or about pH 6.2 to about 6.7.

In some embodiments, the biomass is treated for less than 60, 55, 50, 45, 40, 35, 30, 25, 20, 19, 18, 17, 16, 15, 14, 13, 12, 10, 9, 8, 7, 6, 5, 4, 3, 2, or 1 seconds in the reaction zone. In some embodiments, the biomass is treated for about 5 to 15 seconds in the reaction zone; in larger systems, the biomass is treated for 30 seconds or less, or is treated for 60 seconds or less.

In another embodiment, biomass can be pretreated at an elevated temperature and/or pressure. In one embodiment biomass is pretreated at a temperature range of 20° C. to 400° C. In another embodiment biomass is pretreated at a temperature of about 20° C., 25° C., 30° C., 35° C., 40° C., 45° C., 50° C., 55° C., 60° C., 65° C., 80° C., 90° C., 100° C., 120° C., 150° C., 200° C., 250° C., 300° C., 350° C., 400° C. or higher. In another embodiment, elevated temperatures are provided by the use of steam, hot water, or hot gases. In one embodiment steam can be injected into a biomass containing vessel. In another embodiment the steam, hot water, or hot gas can be injected into a vessel jacket such that it heats, but does not directly contact the biomass.

In another embodiment, a biomass can be treated at an elevated pressure. In one embodiment biomass is pretreated at a pressure range of about 1 psi to about 30 psi. In another embodiment biomass is pretreated at a pressure or about 50 psi, 100 psi, 150 psi, 200 psi, 250 psi, 300 psi, 350 psi, 400 psi, 450 psi, 500 psi, 550 psi, 600 psi, 650 psi, 700 psi, 750 psi, 800 psi or more up to 900 psi. In some embodiments, biomass can be treated with elevated pressures by the injection of steam in a biomass containing vessel. In one embodiment, the biomass can be treated to vacuum conditions prior or subsequent to alkaline or acid treatment or any other treatment methods provided herein.

In one embodiment acid-pretreated biomass is washed (e.g. with water (hot or cold) or other solvent such as alcohol (e.g. ethanol)), pH neutralized with a base, or buffering agent (e.g. phosphate, citrate, borate, or carbonate salt) or dried prior to fermentation. In one embodiment, the drying step can be performed under vacuum to increase the rate of evaporation of water or other solvents. Alternatively, or additionally, the drying step can be performed at elevated temperatures such as about 20° C., 25° C., 30° C., 35° C., 40° C., 45° C., 50° C., 55° C., 60° C., 65° C., 80° C., 90° C., 100° C., 120° C., 150° C., 200° C., 250° C., 300° C. or more.

In one embodiment of the present disclosure, a pretreatment step includes a step of solids recovery. The solids recovery step can be during or after pretreatment (e.g., acid pretreatment), or before the drying step. In one embodiment, the solids recovery step provided by the methods of the present disclosure includes the use of flocculation, centrifugation, a sieve, filter, screen, or a membrane for separating the liquid and solids fractions. In one embodiment a suitable sieve pore diameter size ranges from about 0.001 microns to 8 mm, such as about 0.005 microns to 3 mm or about 0.01 microns to 100 microns. In one embodiment a sieve pore size has a pore diameter of about 0.01 microns, 0.02 microns, 0.05 microns, 0.1 microns, 0.5 microns, 1 micron, 2 microns, 4 microns, 5 microns, 10 microns, 20 microns, 25 microns, 50 microns, 75 microns, 100 microns, 125 microns, 150 microns, 200 microns, 250 microns, 300 microns, 400 microns, 500 microns, 750 microns, 1000 or more. In one embodiment, biomass is processed or pretreated prior to lignin separation from cellulose. In one embodiment a method of pre-treatment includes but is not limited to, biomass particle size reduction, such as for example shredding, milling, chipping, crushing, grinding, or pulverizing. In one embodiment, biomass particle size reduction can include size separation methods such as sieving, or other suitable methods known in the art to separate materials based on size. In one embodiment size separation can provide for enhanced yields. In one embodiment, separation of finely shredded biomass (e.g. particles smaller than about 8 mm in diameter, such as, 8, 7.9, 7.7, 7.5, 7.3, 7, 6.9, 6.7, 6.5, 6.3, 6, 5.9, 5.7, 5.5, 5.3, 5, 4.9, 4.7, 4.5, 4.3, 4, 3.9, 3.7, 3.5, 3.3, 3, 2.9, 2.7, 2.5, 2.3, 2, 1.9, 1.7, 1.5, 1.3, 1, 0.9, 0.8, 0.7, 0.6, 0.5, 0.4, 0.3, 0.2, or 0.1 mm) from larger particles allows the recycling of the larger particles back into the size reduction process, thereby increasing the final yield of processed biomass.

In one embodiment, the parameters of the pretreatment are changed such that concentration of accessible cellulose in the pretreated feedstock is 1%, 5%, 10%, 12%, 13%, 14%, 15% 16%, 17%, 19%, 20%, 30%, 40% or 50%. In one embodiment, the parameters of the pretreatment are changed such that concentration of accessible cellulose in the pretreated feedstock is 25% to 35%. In one embodiment, the parameters of the pretreatment are changed such that concentration of accessible cellulose in the pretreated feedstock is 10% to 20%.

In one embodiment, the parameters of the pretreatment are changed such that concentration of hemicellulose in the pretreated feedstock is 1%, 5%, or 10%. In one embodiment, the parameters of the pretreatment are changed such that concentration of hemicellulose in the pretreated feedstock is 1% to l0%. In one embodiment, the parameters of the pretreatment are changed such that concentration of hemicellulose in the pretreated feedstock is 1% to 8%.

In one embodiment, the parameters of the pretreatment are changed such that concentration of soluble oligomers in the pretreated feedstock is 1%, 10%, 15%, 20%, 25%, 30%, 35%, 40%, 45%, 50%, 55%, 60%, 65%, 70%, 75%, 80%, 85%, 90%, 95%, or 99%.

Examples of soluble oligomers include, but are not limited to, cellobiose and xylobiose. In one embodiment, the parameters of the pretreatment are changed such that concentration of soluble oligomers in the pretreated feedstock is 30% to 90%. In one embodiment, the parameters of the pretreatment are changed such that concentration of soluble oligomers in the pretreated feedstock is 45% to 80%. In one embodiment, the parameters of the pretreatment and/or hydrolysis are changing such that most of the hemicellulose and/or C5 monomers and/or oligomers are removed prior to the recovery of the C6/lignin mixture.

In one embodiment, the parameters of the pretreatment are changed such that concentration of simple sugars in the pretreated feedstock is 1%, 5%, 10%, 12%, 13%, 14%, 15%, 16%, 17%, 19%, 20%, 30%, 40% or 50%. In one embodiment, the parameters of the pretreatment are changed such that concentration of simple sugars in the pretreated feedstock is 0% to 20%. In one embodiment, the parameters of the pretreatment are changed such that concentration of simple sugars in the pretreated feedstock is 0% to 5%. Examples of simple sugars include, but are not limited to, C5 and C6 monomers and dimers.

In one embodiment, the parameters of the pretreatment are changed such that concentration of lignin in the pretreated and/or hydrolyzed feedstock is 1%, 5%, 10%, 12%, 13%, 14%, 15%, 16%, 17%, 19%, 20%, 30%, 40% or 50% and optimal for fractionation.

In one embodiment, the parameters of the pretreatment are changed such that concentration of furfural and ash in the pretreated and/or hydrolyzed feedstock is less than 10%, 9%, 8%, 7%, 6%, 5%, 4%, 3%, 2%, or 1%. In one embodiment, the parameters of the pretreatment and/or hydrolysis are changed such that concentration of furfural and ash in the pretreated feedstock is less than 1% to 2%.

In one embodiment, the parameters of the pretreatment are changed to obtain a low concentration of hemicellulose and a high concentration of lignin and cellulose.

Biofuel Plant and Process of Producing Biofuel and Biochemicals:

Generally, there are several basic approaches to producing reactive lignin, fuels and chemical end-products from biomass on a large scale. In the one method, one first pretreats and hydrolyzes a biomass material that includes high molecular weight carbohydrates to lower molecular weight carbohydrates and a high concentration of lignin residues, and then ferments the lower molecular weight carbohydrates utilizing of microbial cells to produce fuel or other products. In the second method, one treats the biomass material itself using mechanical, chemical and/or enzymatic methods. In all methods, depending on the type of biomass and its physical manifestation, one of the processes can comprise a milling of the carbonaceous material, via wet or dry milling, to reduce the material in size and increase the surface to volume ratio (physical modification). Further reduction in size can occur during hydrolysis depending on the type of mechanisms used to pretreat the feedstock. For example, use of an extruder with one or more screws to physically hydrolyze the biomass will result in a reduction in particle size as well. See, e.g., the process described in PCT/US2015/064850, incorporated by reference herein in its entirety.

In one embodiment, hydrolysis can be accomplished using acids, e.g., Bronsted acids (e.g., sulfuric or hydrochloric acid), or combination of these. Hydrolysis and/or steam treatment of the biomass can, e.g., increase porosity and/or surface area of the biomass, often leaving the cellulosic and lignin materials more exposed to further treatment, which can increase yield of sugars, cellulose and lignin. Removal of lignin following solubilization can result in a low sulfur, low ash, and high porosity reactive lignin residue for the production of resins, foams, cements and other products. The lignin residues can comprise 50% or more of solid particles.

In another aspect, a separation unit is provided that comprises a means to separate the cellulose/lignin residues from the sugars, proteins, any products formed, and other materials. Separation can occur by means of filtration, flocculation, centrifugation, and the like. In another aspect, products made by any of the processes described herein are also provided herein.

This system can be constructed so that all of the units are physically close, if not attached to one another to reduce the costs of transportation of a product. For example, the pretreatment, enzymatic hydrolysis, separation, and lignin recovery unit can all be located near a woodshed, at a sawmill or agricultural site. Not only is the cost of transporting the biomass to the pretreatment unit virtually eliminated, the sugars, sugar polymers, and lignin residues are processed in the units, thus eradicating the cost of shipping the platform products. Thus, in addition to sugars, sugar products, reactive lignin, fuels, such as ethanol, and other biochemicals, the same processing facility can produce activated carbon and/or other lignin products for many different uses.

EXAMPLES

The following examples serve to illustrate certain embodiments and aspects and are not to be construed as limiting the scope thereof.

Example 1. Pretreatment of Biomass

A twin screw extruder (32 mm unit) was used to perform pretreatment on hardwood sawdust. A flow rate of up to 300 lb/hr was reached through the extruder, with direct steam injection to supply process heat. The feed was metered through a weight belt feeder and fell into a crammer feeder supplying the barrel of the extruder. The biomass was conveyed through the extruder to a high-pressure grinding section, where a high pressure plug is formed prior to the material entering the high pressure reaction zone. Within the reaction zone, two screws intermeshed and provided rapid heat and mass transfer when steam and sulfuric acid were injected through steam and acid ports connected to the cylindrical barrel of the extruder. The steam and acid supplying ports were sealed by reverse-flow or kneading sections in the screws. A hydraulically-operated pressure control valve was attached and operated at the exit of the extruder to maintain as constant a pressure as possible in the reaction zone of the extruder. The combination of acid hydrolysis and mechanical grinding in the reaction zone further reduced the particle size of the biomass.

The solids were exposed to high temperature and pressure and low pH for a maximum of about 10 seconds or more fin the reaction zone of the extruder before being exploded into the flash tank. Residence time in the reaction zone was controlled by the feed rate and the rotational speed of the screws. The surge chamber above the screws in the pump feeder acted as a flash vessel, where hot water is vaporized, cooling the product and removing some of the low-boiling inhibitors, such as furfural. HMF and furfural. Inhibitors, were formed in small amounts during this pretreatment (e.g., a total of 0.3 to 0.5 wt. % of the dry pretreated product).

The product was collected, and the sugar stream and low levels of soluble byproducts were removed from the solid cellulose and lignin fractions, washed with water and the wash water collected. It should be noted that over 90% of the available xylose and 20% of the available glucose was solubilized in the pretreatment step, indicating high conversions of hemicellulose and amorphous cellulose. The remaining solids were resuspended, and the pH raised to 11.5 with NaOH at room temperature and pressure to solubilize the lignin and remove cellulose as the main solid fraction. It was also noted that the lignin from these processes was soluble in NaOH at a wide range of temperatures and NaOH concentrations.

Example 2. Fractionation of Lignin Samples

Lignin sample 1. Birch hardwood was pretreated using the pretreatment system described supra and the lignin/carbohydrate fraction produced was solubilized by raising the pH to 11.5 using sodium hydroxide (NaOH). The soluble lignin fraction was separated from the residual solids by centrifugation and the pH lowered to 7 using sulfuric acid. The solids that precipitated after lowering the pH to 7 were retained and designated SW-2. The remaining solution was then lowered from pH 7 to pH 3.5 with additional sulfuric acid. The quantity of lignin that precipitated out of solution and isolated following this step was designated SW-1. Samples of SW-1 and SW-2 were analyzed and compared to a standard Indulin-AT lignin sample to determine molar mass, molecular weight, polydispersity index (PDI) and hydroxyl group content. Results are provided in Table 1.

Lignin sample 2. Birch hardwood was pretreated using the pretreatment system described supra and the lignin/carbohydrate fraction produced was solubilized by raising the pH to 11.5 using sodium hydroxide (NaOH). The soluble lignin fraction was separated from the residual solids by centrifugation and the pH lowered to 9 using sulfuric acid. The solids that precipitated after lowering the pH to 9 were retained and designated High. The remaining solution was then lowered from pH 9 to pH 3 with additional sulfuric acid. The quantity of lignin that precipitated out of solution and isolated following this step was designated Low. This procedure removed additional carbohydrate from these samples. The High and Low samples were analyzed and compared to a standard Indulin-AT lignin sample to determine molar mass, molecular weight, polydispersity index (PDI) and hydroxyl group content. Results are provided in Table 1.

TABLE 1 pH-Fractionated Lignin Molar Mass, Molecular Weight, and Polydispersity Index Results

| Sample ID | Mn (Da) | Mw (Da) | PDI |
|---|---|---|---|
| High | 1900 | 5800 | 3.1 |
| Low | 1400 | 3000 | 2.2 |
| SW-1 | 1230 | 1950 | 1.6 |
| SW-2 | 1760 | 6200 | 3.5 |
| Indulin-AT | 2000 | 6600 | 3.3 |

The results show that isolating the lignin precipitated exclusively at the lower pH range (under pH 7-9) is a specialty lignin (SW-1, Low) that is much lower in molecular weight, that is more tightly distributed, and has a hydroxyl group content that is more than double that of the fraction isolated by precipitating between a pH of 11.5 and 7. The SW-1 and Low samples are very unique lignin fractions that have uses across multiple applications. They can amount to 10-25% of the available lignin in the original biomass.

Example 3. Ash Content

Crucibles were oven dried for 24 hr at 105° C. following which lignin samples were weighed in the crucibles and dried for 3 h at the same temperature. Samples were then transferred to a furnace and held at 525° C. for 4 hr. The ash content was calculated and measured according to TAPPI T 211 om-93 standard method. The results are shown in Table 2. The ash content of sample Low is less than 1.5%.

TABLE 2

Ash Content

| | % Ash Content |
|---|---|
| High | 4.19 ± 0.19 |
| Low | 1.22 ± 0.04 |
| SW-1 | — |
| SW-2 | 18.9 |
| Indulin-AT lignin | 4.34 ± 0.22 |

Example 4. Elemental Analysis

The nitrogen content was analyzed using a 2400 CHNS/O Series II System (PerkinElmer). Mineral contents were determined by Inductively Coupled Plasma Optic Emission Spectrophotometer (ICP-OES). Tested samples were prepared based on the method derived from AOAC 985.01 (American Association of Analytical Chemists), before analyzing the samples with ICP. The results are shown in Table 3. The Low molecular weight (mw) sample has a much lower ash content than Indulin-AT; that coupled with its low sulfur content makes it highly useful in a large number of polymer applications. Separate testing of the SW-1 fraction verifies its low ash (1.30 wt. %) and sulfur content (0.296 wt. %).

TABLE 3

Elemental Analysis 3

| Sample ID | N (%) | S (%) | P (%) | K (%) | Mg (%) | Ca (%) | Na (%) | B (ppm) | Zn (ppm) | Mn (ppm) | Fe (ppm) | Cu (ppm) | Al (ppm) |
|---|---|---|---|---|---|---|---|---|---|---|---|---|---|
| High | 0.22 | 0.94 | 0.005 | 0.018 | 0.001 | 0.013 | 1.31 | 3 | 2 | 4 | 22 | 2 | 25 |
| Low | 0.35 | 0.25 | 0.002 | 0.003 | 0.001 | 0.01 | 0.46 | 5 | 1 | 1 | 48 | 5 | 15 |
| SW-1 | 0.38 | 2.04 | 0.005 | 0.06 | 0.002 | 0.014 | 3.26 | 6 | 2 | 1 | 75 | 2 | 6 |
| SW-2 | 0.21 | 0.34 | 0.002 | 0.04 | 0.001 | 0.013 | 1.26 | 1 | 4 | 15 | 22 | 3 | 4 |
| Indulin-AT | 0.65 | 1.96 | 0.001 | 0.09 | 0.015 | 0.04 | 0.82 | 22 | 17 | 39 | 46 | 2 | 146 |

Example 5. Lignin Acetylation and Gel Permeation Chromatography (GPC) Procedure

A 1 g lignin sample was added to 40 ml of pyridine-acetic anhydride solution (50/50 v/v %) and the solution mixed at room temperature for 24 hours. Then 150 ml of hydrochloric acid (pH 1) was added to the solution to precipitate the lignin particles. The precipitates were vacuum filtered and residual solids were washed with hydrochloric acid (1 M) solution 3 times followed by deionized water several times. The residual solids were dried in a vacuum oven at 40° C. overnight.

Figure 1B:
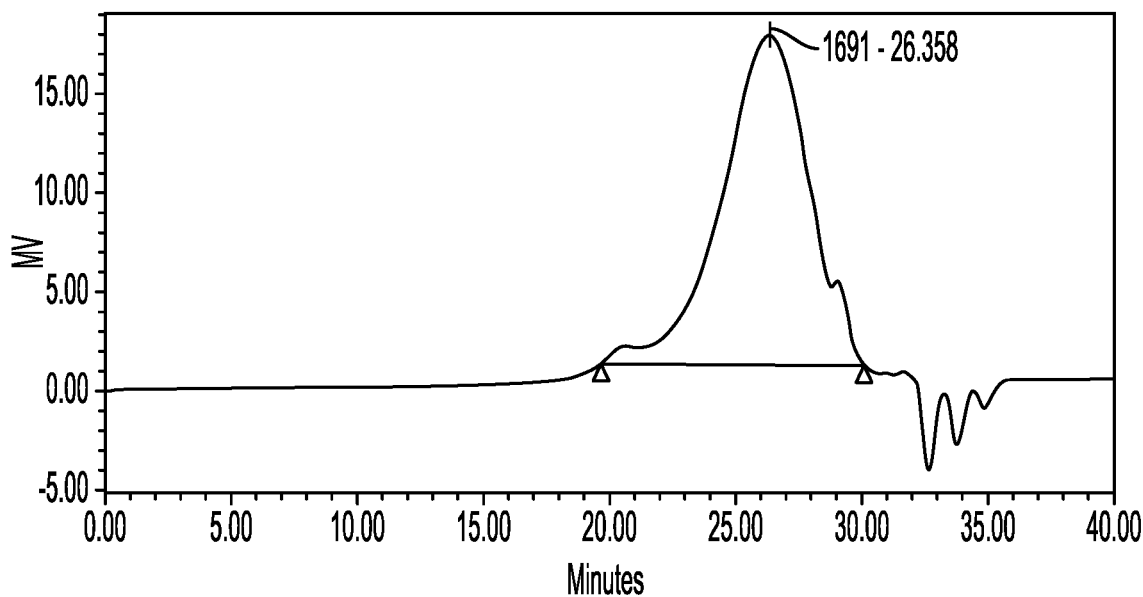

Each lignin sample was acetylated before GPC analysis to ensure their 100% solubility in THF (tetrahydrofuran). The molar mass distribution of samples was performed using GPC (Waters) with THF as the mobile phase. Polystyrenes with molecular weights (162, 370, 580, 1000, 1300, 2000, 3000, 5000, 7000, 10000 Da) from Agilent were used as calibration standards. A Reflective index detector (Waters 2414) was used to collect the signals. As shown in Table 1 and FIGS. 1A and 1B, the molecular weight, molecular number and polydispersity index of sample SW-1 and sample Low is very low, which makes it a very good lignin for polymeric application.

Figure 2A:
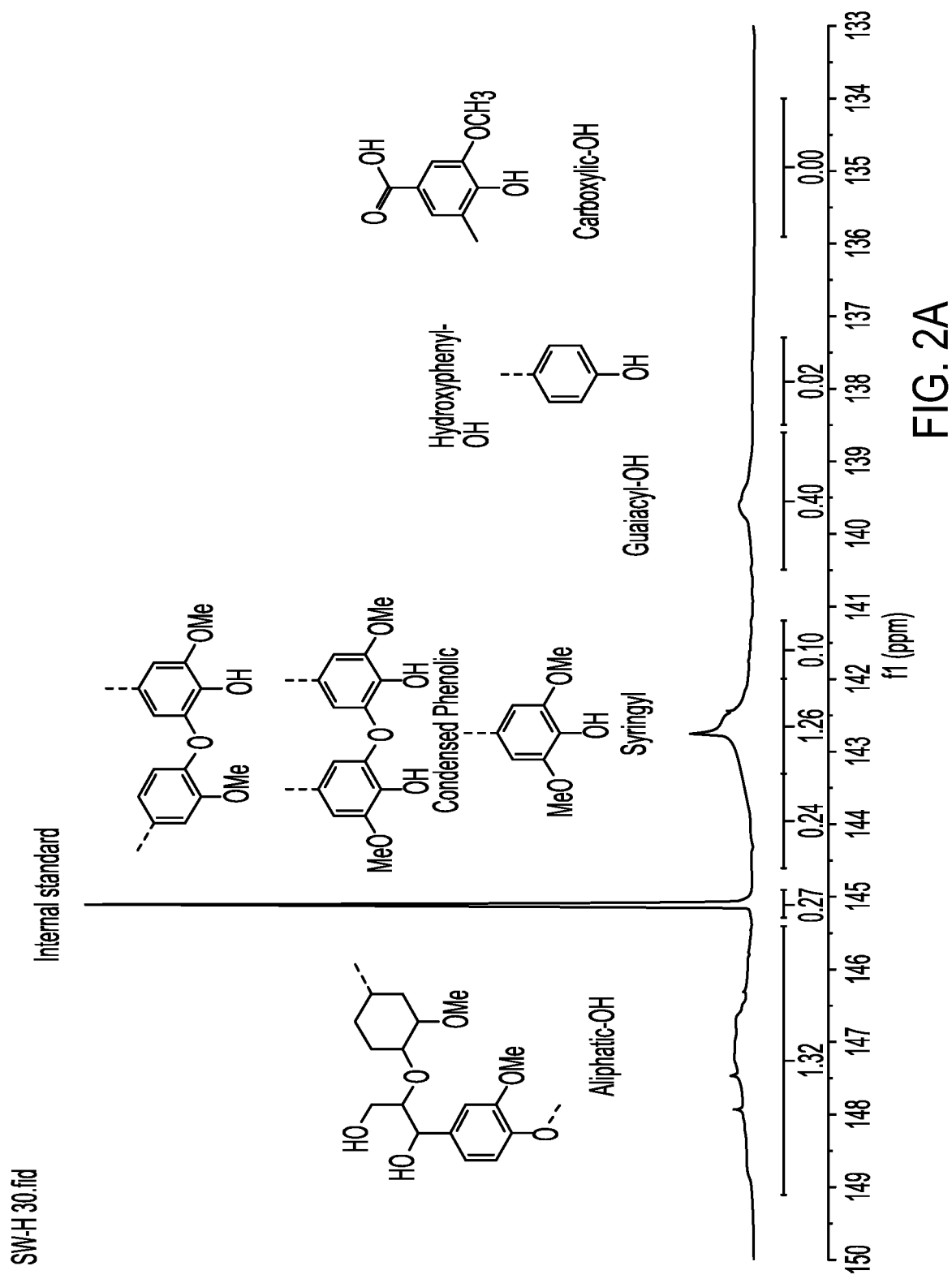
FIGS. 2A-2B are graphs of $^{31}$P-NMR analyses for samples High (FIG. 2A) and Low (FIG. 2B).
Figure 2B:
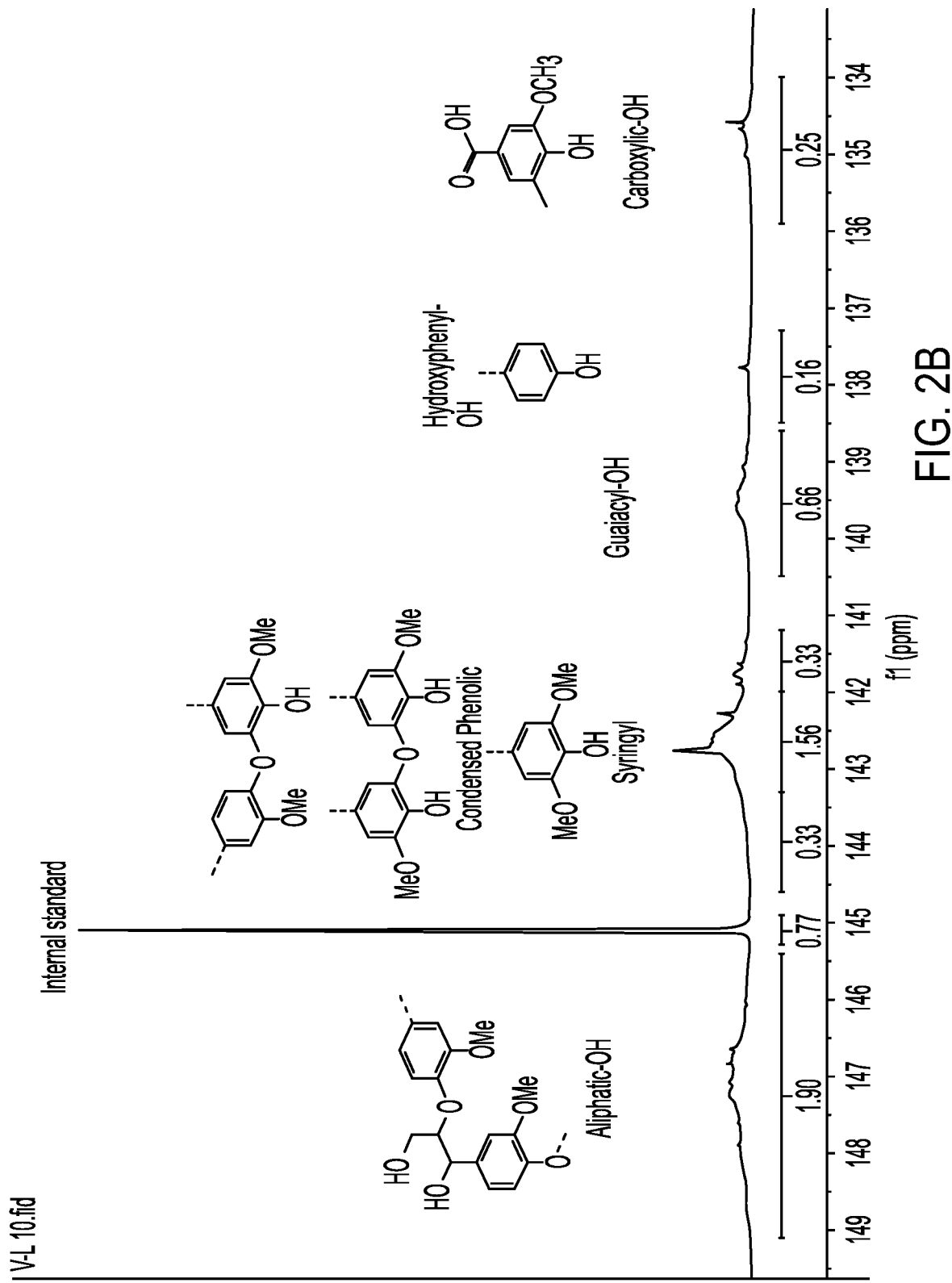

Example 6. $^{31}$P-NMR Procedure 40 mg of dry lignin was dissolved in 500 µl of anhydrous pyridine and deuterated chloroform (1.6:1, v/v) followed by the addition of 100 µl of cyclohexanol (22.01 mg/ml) as an internal standard. Then 50 µl of chromium (III) acetylacetonate solution (5.6 mg/ml) was used as relaxation reagent and 100 µl of 2-chloro-4,4,5,5-tetramethyl-1,3,2-dioxaphospholane as phosphitylating reagent. NMR analyses were performed on an Agilent DDR2 500 MHz NMR spectrometer equipped with 7600AS, running VnmrJ3.2A with relaxation delay of 5 s, and 512 scans. The $^{31}$P-NMR results are shown in FIGS. 2A (High) and 2B (Low) and Table 4.

TABLE 4 pH Fractionated Lignin Hydroxyl Group Testing Results

Hydroxyl Content (mmole/g)

| Sample ID | Aliphatic | Condensed Phenolic | Syringyl | Guaiacyl | Hydroxyphenyl | Carboxylic | Total Phenolic | Total Hydroxyl |
|---|---|---|---|---|---|---|---|---|
| High | 1.72 | 0.34 | 1.26 | 0.40 | 0.02 | 0.00 | 2.02 | 3.74 |
| Low | 1.80 | 0.66 | 1.56 | 0.66 | 0.16 | 0.25 | 3.04 | 5.06 |
| SW-1 | 6.58 | 0.46 | 3.66 | 0.5 | 1.22 | 0.36 | 5.84 | 12.78 |
| SW-2 | 3.33 | 0.23 | 1.54 | 0.16 | 0.56 | 0.1 | 2.49 | 5.92 |
| Indulin-AT | 1.98 | 0.73 | 0.51 | 1.76 | 0.27 | 0.39 | 3.27 | 5.64 |

Example 7. Fourier Transform Infrared (FTIR) Spectrometer

Figure 3:
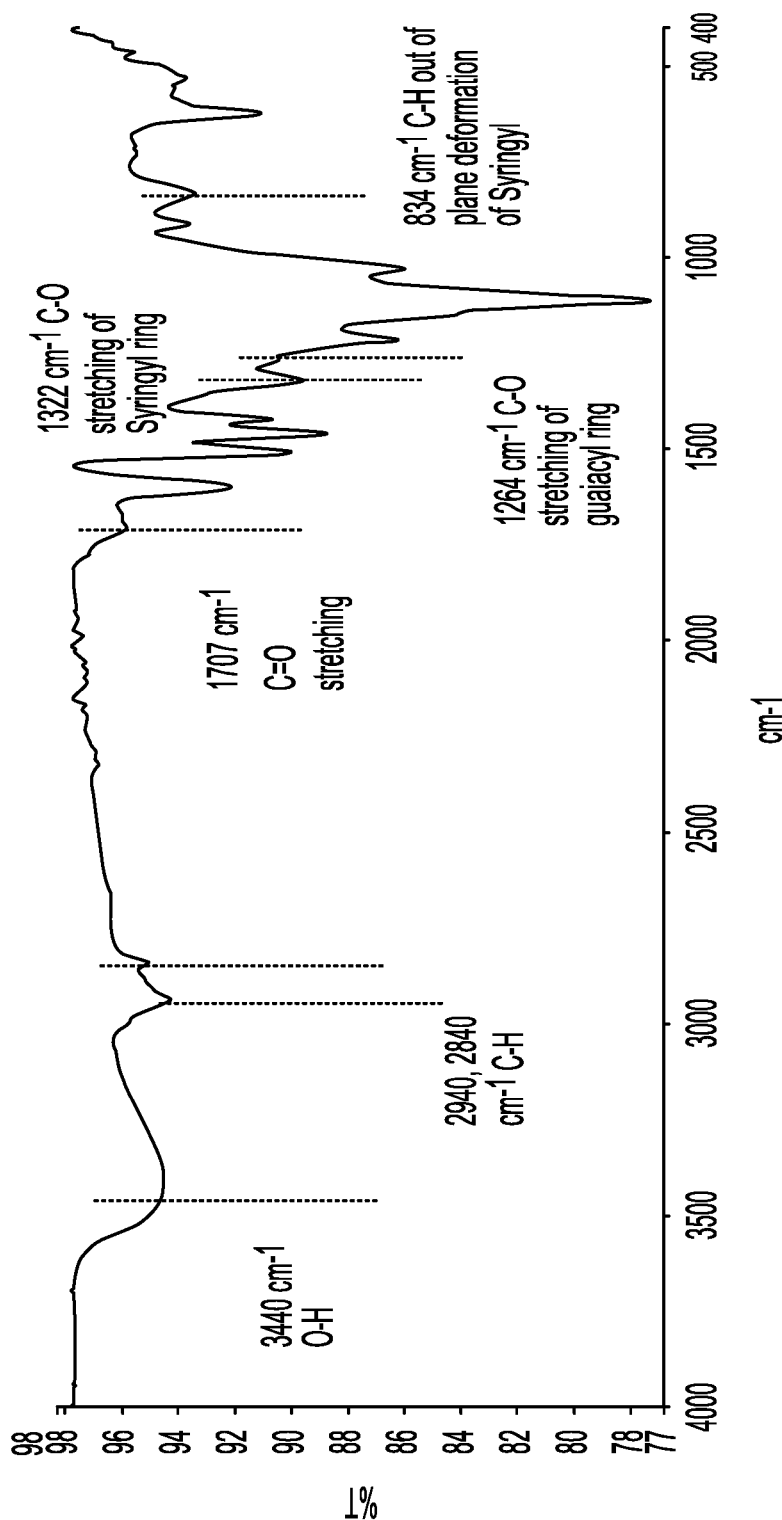
FIG. 3 is a graph depicting the spectra of High lignin fraction using a Fourier Transform Infrared (FTIR). spectrometer.
Figure 4:
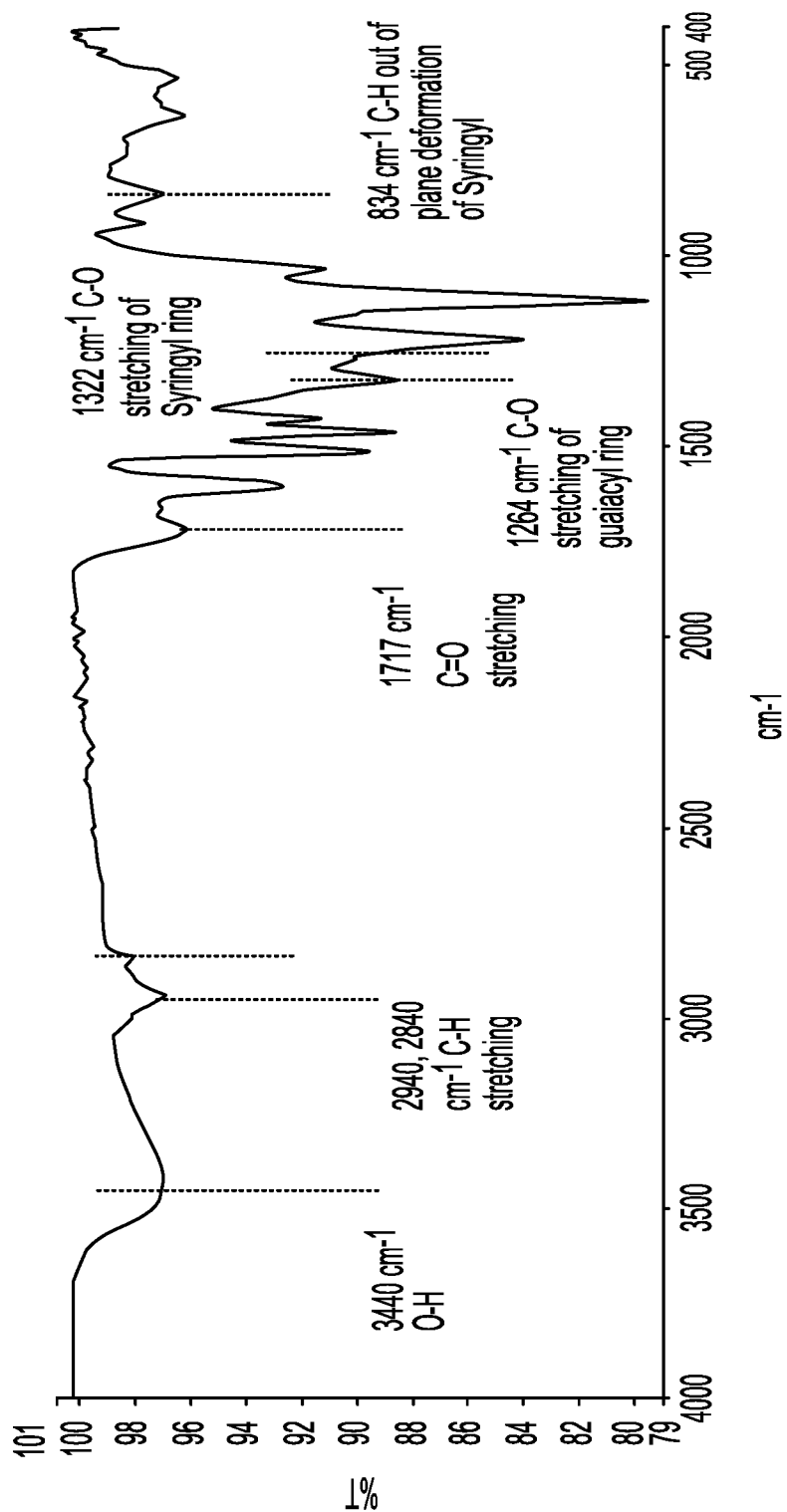
FIG. 4 is a graph depicting the spectra of the Low lignin fraction using a Fourier Transform Infrared (FTIR).

Lignin samples were analyzed using an FTIR spectrometer (Spectrum Two) from PerkinElmer in annotated total reflectance mode (FTIR-ATR). The spectra were recorded in a frequency range between 400 and 4000 cm$^{-1}$ at a resolution of 4 cm$^{-1}$ with 32 scans; a background scan was collected before each run. The results for the lignin fraction High are shown in FIG. 3 and for the lignin fraction Low in FIG. 4.

Example 8. Thermogravimetric Analysis (TGA) Procedure

Figure 5:
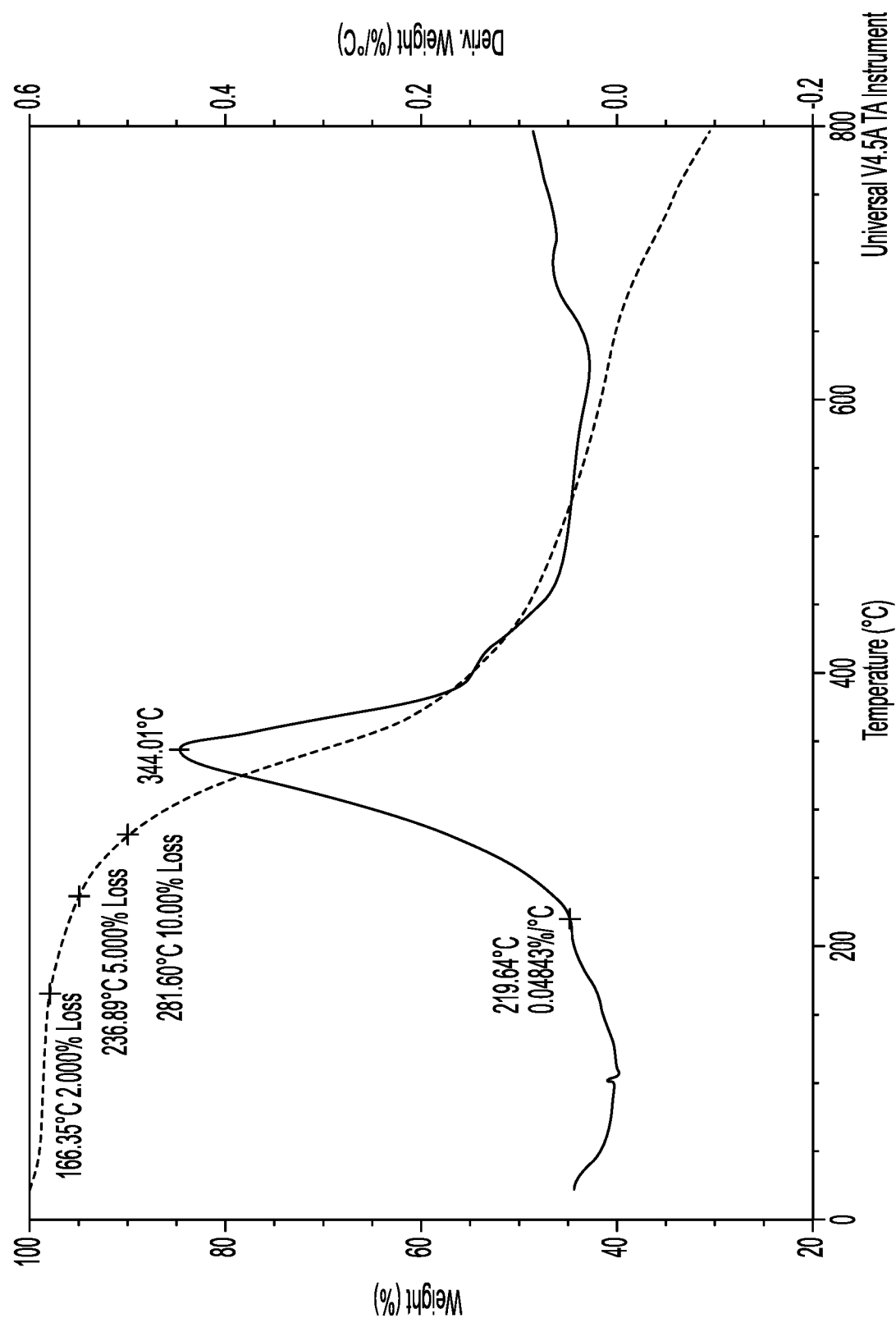
FIG. 5 is a graph depicting a Thermogravimetric Analysis (TGA) of the High lignin fraction.
Figure 6:
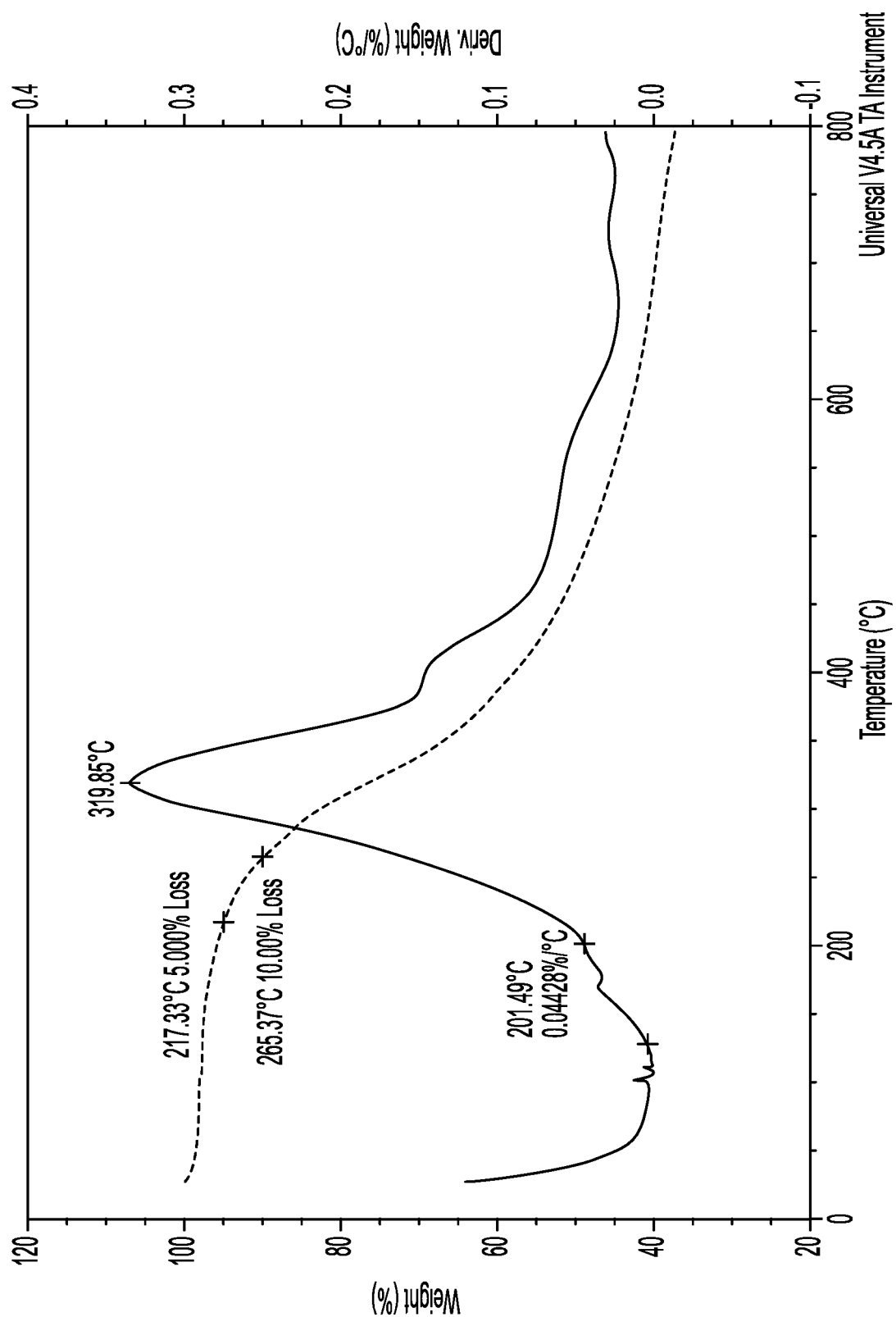
FIG. 6 is a graph depicting a Thermogravimetric Analysis (TGA) of the Low lignin fraction.

Lignin samples were analyzed by TGA Q50 from a TA instrument from room temperature to 105° C. and isothermal for 10 mins; then heat gain from 105° C. to 800° C. The heating rate was 10° C./min under a nitrogen atmosphere. The results are shown in Table 5, FIG. 5 for the lignin fraction High and FIG. 6 for the lignin fraction Low.

TABLE 5

Thermogravimetric Analysis

| Lignin ID | T onset (° C.) | T at 5% loss (° C.) | T at 10% loss (° C.) | 1st derivative peak T (° C.) |
|---|---|---|---|---|
| High | 220 | 237 | 282 | 344 |
| Low | 201 | 217 | 265 | 320 |
| SW-1 | 214 | 232 | 271 | 304 |
| SW-2 | 163 | 206 | 251 | 306 |
| Indulin AT | 122 | 214 | 270 | 360 |

Example 8. Differential Scanning Calorimetry (DSC) Analysis Procedure

Figure 7A:
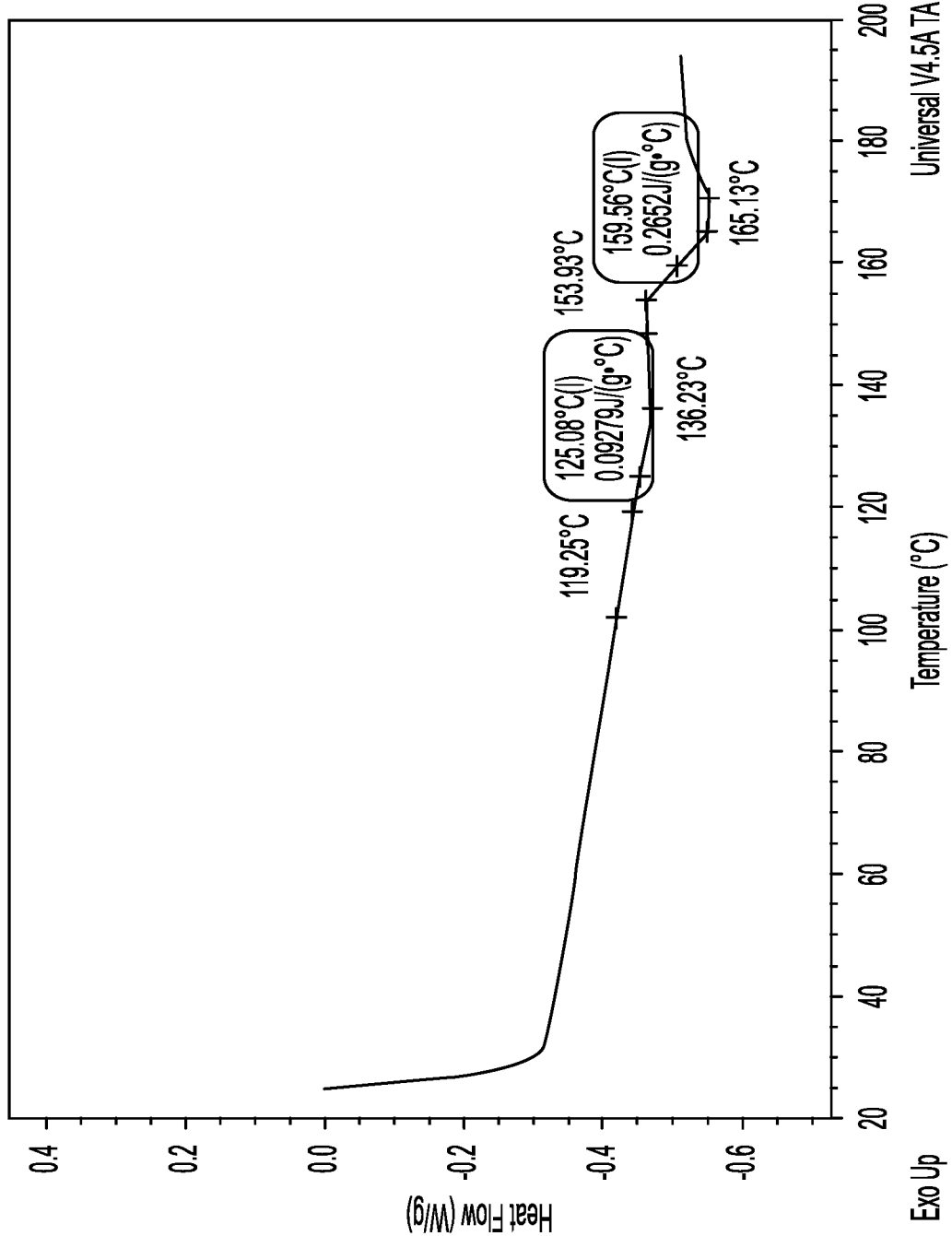
FIGS. 7A-7B are graphs depicting DSC analysis of SW-1 lignin (FIG. 7A) and SW-2 lignin (FIG. 7B).
Figure 7B:
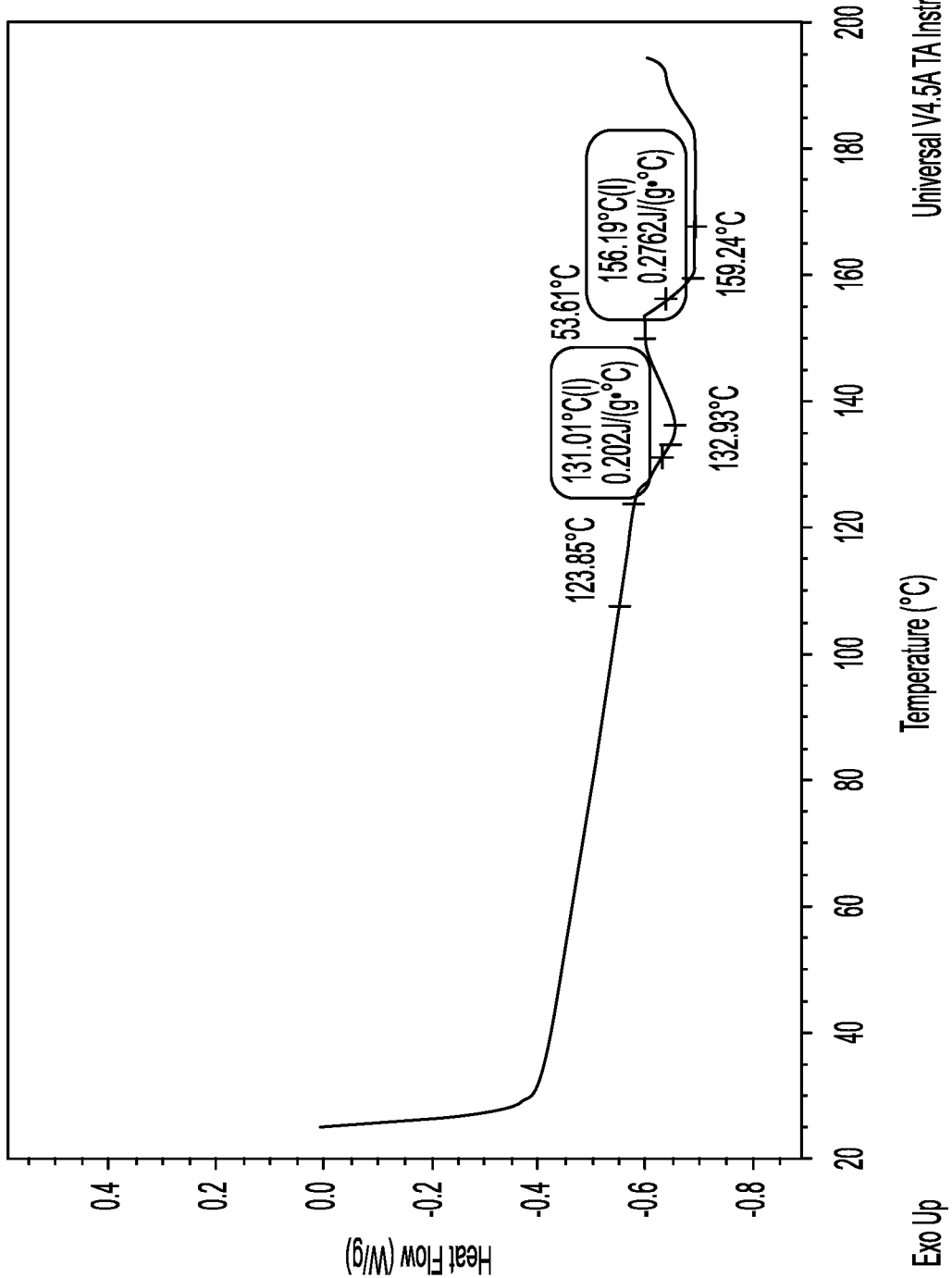
Figure 8:
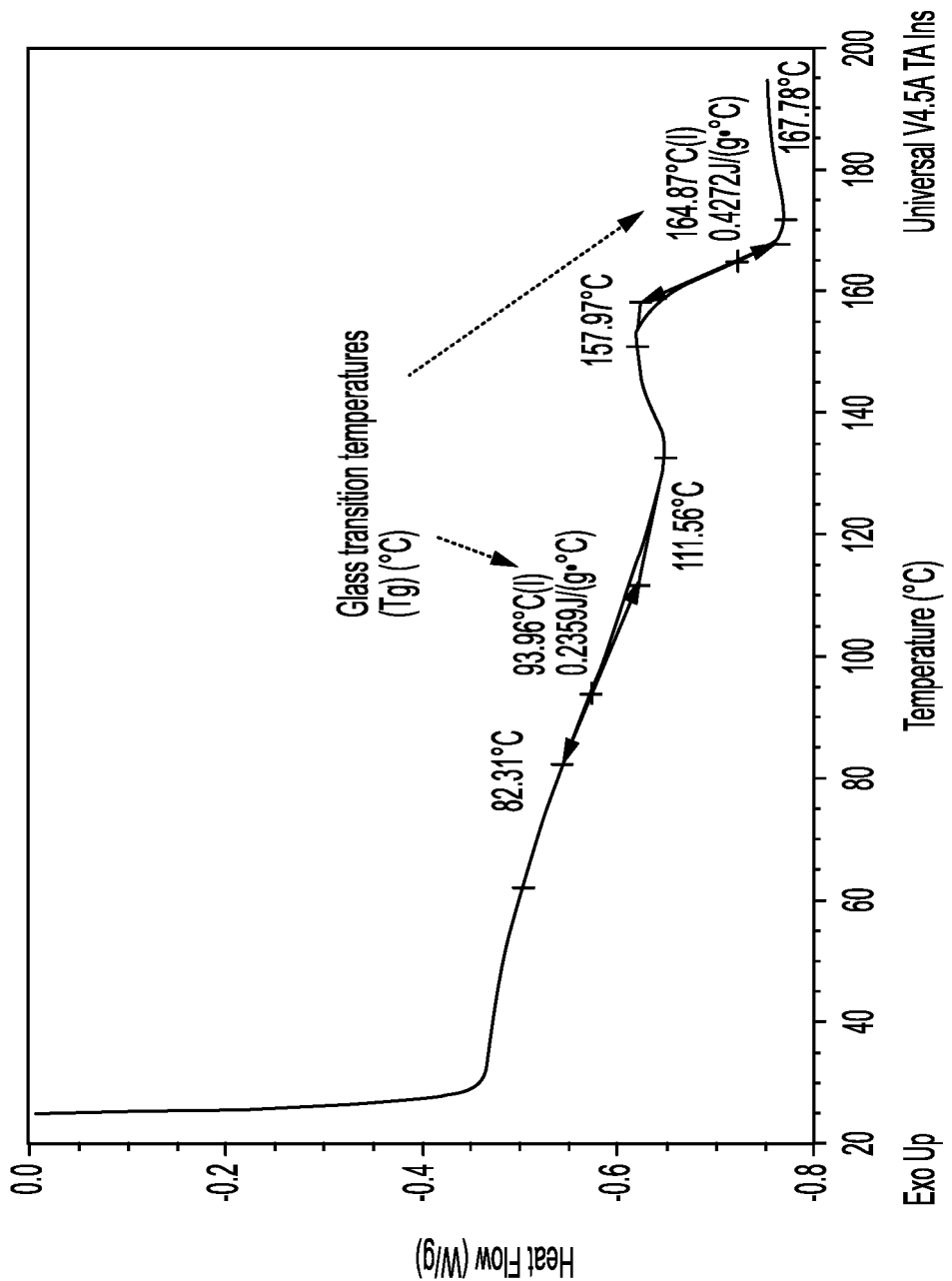
FIG. 8 is a graph depicting DSC analysis of the High lignin fraction.
Figure 9:
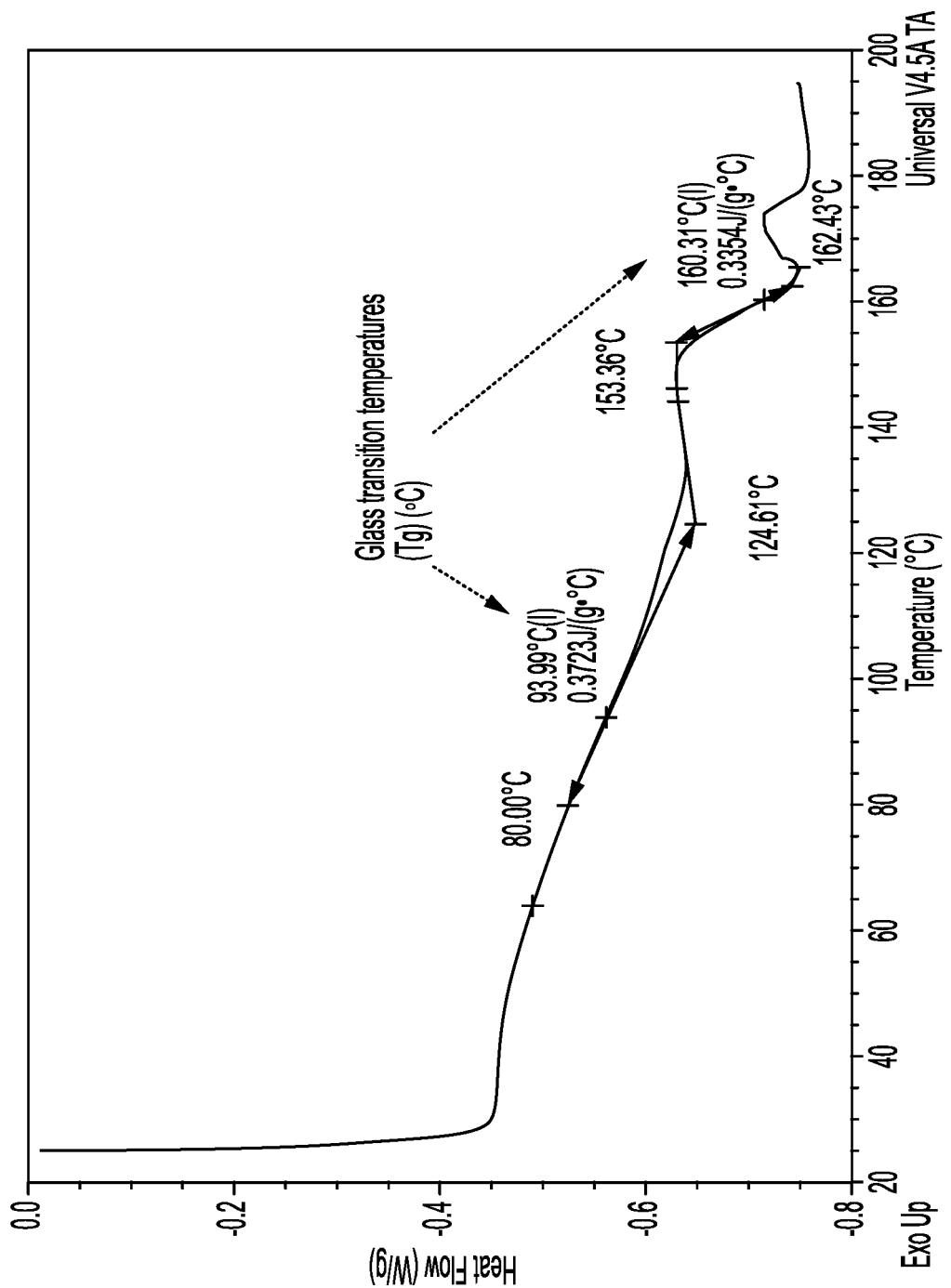
FIG. 9 is a graph depicting DSC analysis of the Low lignin fraction.

DSC Analysis was performed on lignin samples using a DSC Q100 (TA Instruments). The conditions of the heat/cool/heat cycles were as follows: room temperature to 120° C.; cooled to 25° C. and isothermal for 10 min; then heated to 200° C. The heating rate was 20° C./min under N$_2$. The second heating cycle was used to determine the glass transition temperature (Tg). The results of the DSC analysis for SW-1 and SW-2, High and Low lignin fractions are shown in FIGS. 7A and 7B (SW-1, SW-2), FIG. 8 (High), FIG. 9 (Low), and in Table 6.

TABLE 6

Differential Scanning Calorimetry

| Lignin ID | Tg-1 (° C.) (Inflection) | T onset-1 (° C.) | T offset-1 (° C.) | Tg-2 (° C.) (Inflection) | T onset-2 (DC) | T offset-2 (° C.) | Cp-2 (J/g · ° C.) |
|---|---|---|---|---|---|---|---|
| High | 94 | 82.3 | 111.6 | 165 | 158 | 168 | 0.43 |
| Low | 94 | 80 | 125 | 160.3 | 153.4 | 162.4 | 0.3 |
| SW-1 | 125 | 119 | 136 | 160 | 154 | 165 | 0.26 |
| SW-2 | 131 | 124 | 133 | 156 | 154 | 159 | 0.28 |
| Indulin AT | 84 | 68 | 95 | 172 | 159 | 180 | 0.45 |

Based on these analyses results, it is clear the low molecular weight lignin fraction (Low) has a significantly lower ash (mostly sulfur and sodium) content than higher molecular weight fractions. It also has high phenolic OH content, which makes it an excellent candidate to replace 100% of bisphenol-A in epoxy resin formulations. Both the high and low molecular weight lignins can be used to formulate polyurethane (PU) adhesives, replacing 100% petroleum-based polyol.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for producing a reactive lignin from a biomass, the method comprising:
   (a) pretreating the biomass with acid and steam explosion to produce: (1) a liquid component comprising a solubilized first carbohydrate fraction, and (2) a solid component comprising a second carbohydrate fraction and a first lignin fraction;
   (b) separating the liquid component from the solid component;
   (c) treating the solid component with a pH of at least 8 to solubilize the first lignin fraction and precipitate the second carbohydrate fraction;
   (d) separating the solubilized first lignin fraction from the precipitated second carbohydrate fraction;
   (e) treating the solubilized first lignin fraction with a pH of at least 7 to produce a second lignin fraction that is precipitated and a third lignin fraction that is solubilized;
   (f) separating the second lignin fraction from the third lignin fraction; and
   (g) treating the third lignin fraction with a pH of 5 or lower to precipitate the reactive lignin,
   wherein the reactive lignin has a molecular weight ($M_w$) under 3000 Da, a molar mass ($M_n$) under 1700 Da, and a sulfur content under 2.5 wt. %.

2. The method of claim 1, wherein the duration of the pretreating step is less than 30 seconds.

3. The method of claim 1, wherein the first lignin fraction is solubilized by an alkali.

4. The method of claim 1, wherein the first lignin fraction is solubilized by raising the pH of the solid component.

5. The method of claim 4, wherein the pH is raised to about 8.5, about 9.0, about 9.5, about 10.0, about 10.5, or about 11.

6. The method of claim 4, wherein the pH is raised by a chemical agent selected from the group consisting of: sodium hydroxide, calcium hydroxide, potassium hydroxide, ammonia, ammonia hydroxide, hydrogen peroxide, and a combination thereof.

7. The method of claim 1, wherein the first lignin fraction is solubilized by a solvent.

8. The method of claim 7, wherein the solvent is selected from the group consisting of: an organosolv, an ionic liquid, and a combination thereof.

9. The method of claim 1, wherein the first lignin fraction is separated from the second carbohydrate fraction by centrifugation, filtration, membrane filtration, diafiltration, or flocculation.

10. The method of claim 1, further comprising separating the reactive lignin by centrifugation, filtration, membrane filtration, diafiltration, or flocculation.

11. The method of claim 1, wherein the second lignin fraction is separated from the third lignin fraction by centrifugation, filtration, membrane filtration, diafiltration, or flocculation.

12. The method of claim 1, wherein the reactive lignin is precipitated with an acid.

13. The method of claim 12, wherein the acid is selected from the group consisting of: sulfuric acid, peroxyacetic acid, hydrochloric acid, phosphoric acid, oxalic acid, lactic acid, formic acid, acetic acid, citric acid, benzoic acid, sulfurous acid, chloroacetic acid, dichloroacetic acid, trichloroacetic acid, and a combination thereof.

14. The method of claim 1, further comprising decolorizing the reactive lignin with a decolorizing agent.

15. The method of claim 14, wherein the decolorizing agent is $H_2O_2$.

16. The method of claim 1, wherein the biomass is selected from the group consisting of:
   silage, agricultural residues, corn stover, bagasse, sorghum, nuts, nut shells, coconut shells, Distillers Dried Solubles, Distillers Dried Grains, Condensed Distillers Solubles Distillers Wet Grains, Distillers Dried Grains with Solubles, woody materials, sawdust, wood chips, timber slash, mill scrap, municipal waste, waste paper, recycled toilet papers, yard clippings, poplars, willows, switchgrass, alfalfa, and prairie bluestem, non-woody plant matter, cellulosic material, lignocellulosic material, hemicellulosic material, carbohydrates, corn, sugar cane, grasses, switchgrass, high biomass sorghum, bamboo, corncobs, and peels and pits.

17. The method of claim 1, wherein a total hydroxyl content of the reactive lignin is higher than 5.00 mmol/g.

18. The method of claim 1, wherein the molecular weight of the reactive lignin is under 2500 Da.

19. The method of claim 1, wherein the sulfur content of the reactive lignin is under 0.50 wt. %.

20. The method of claim 1, comprising treating the solubilized first lignin fraction with a pH of about 9.

* * * * *